United States Patent
Chen et al.

(10) Patent No.: US 12,449,660 B2
(45) Date of Patent: Oct. 21, 2025

(54) OPTICAL LENS ASSEMBLY AND HEAD-MOUNTED ELECTRONIC DEVICE

(71) Applicant: NEWMAX TECHNOLOGY CO., LTD., Taichung (TW)

(72) Inventors: Ping-Yi Chen, Taichung (TW); Fei-Hsin Tsai, Taichung (TW); Cong Ge, Guangdong Province (CN)

( * ) Notice: Subject to any disclaimer, the term of this patent is extended or adjusted under 35 U.S.C. 154(b) by 398 days.

(21) Appl. No.: 18/110,907

(22) Filed: Feb. 17, 2023

(65) Prior Publication Data
US 2024/0176116 A1    May 30, 2024

(30) Foreign Application Priority Data
Nov. 30, 2022    (TW) .................................. 111145788

(51) Int. Cl.
G02B 27/01        (2006.01)
(52) U.S. Cl.
CPC ................................ G02B 27/0172 (2013.01)
(58) Field of Classification Search
CPC ................................................. G02B 27/0172
See application file for complete search history.

(56) References Cited

FOREIGN PATENT DOCUMENTS

CN        110308559 A    *  10/2019    ......... G02B 27/0101

OTHER PUBLICATIONS

CN-110308559-A, translation (Year: 2019).*

* cited by examiner

*Primary Examiner* — Wen Huang
(74) *Attorney, Agent, or Firm* — Bruce Stone LLP; Joseph A. Bruce

(57) ABSTRACT

An optical lens assembly includes: a first element group including: a first lens group with positive refractive power, including one or two lenses; a second element group including: a second lens group with positive refractive power, including two or three lenses; an optical element including, in order from a visual side to an image source side: an absorptive polarizer, a reflective polarizer and a first phase retarder; and a partial-reflective-partial-transmissive element; and a third element group including an image source plane. The first element group, the second element group and the third element group are arranged in order from the visual side to the image source side. When the optical lens assembly satisfies a specific condition, the weight of the device can be reduced, the zoom function can be provided, and the image quality can be ensured.

22 Claims, 10 Drawing Sheets

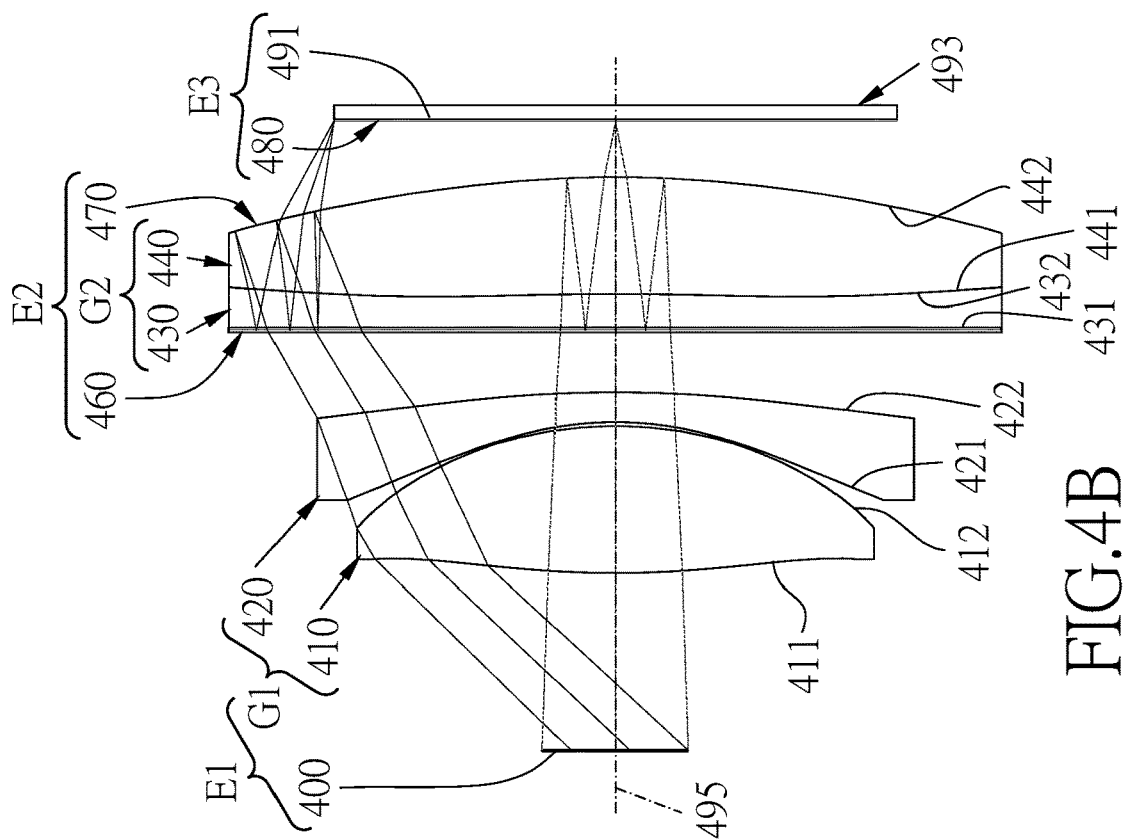
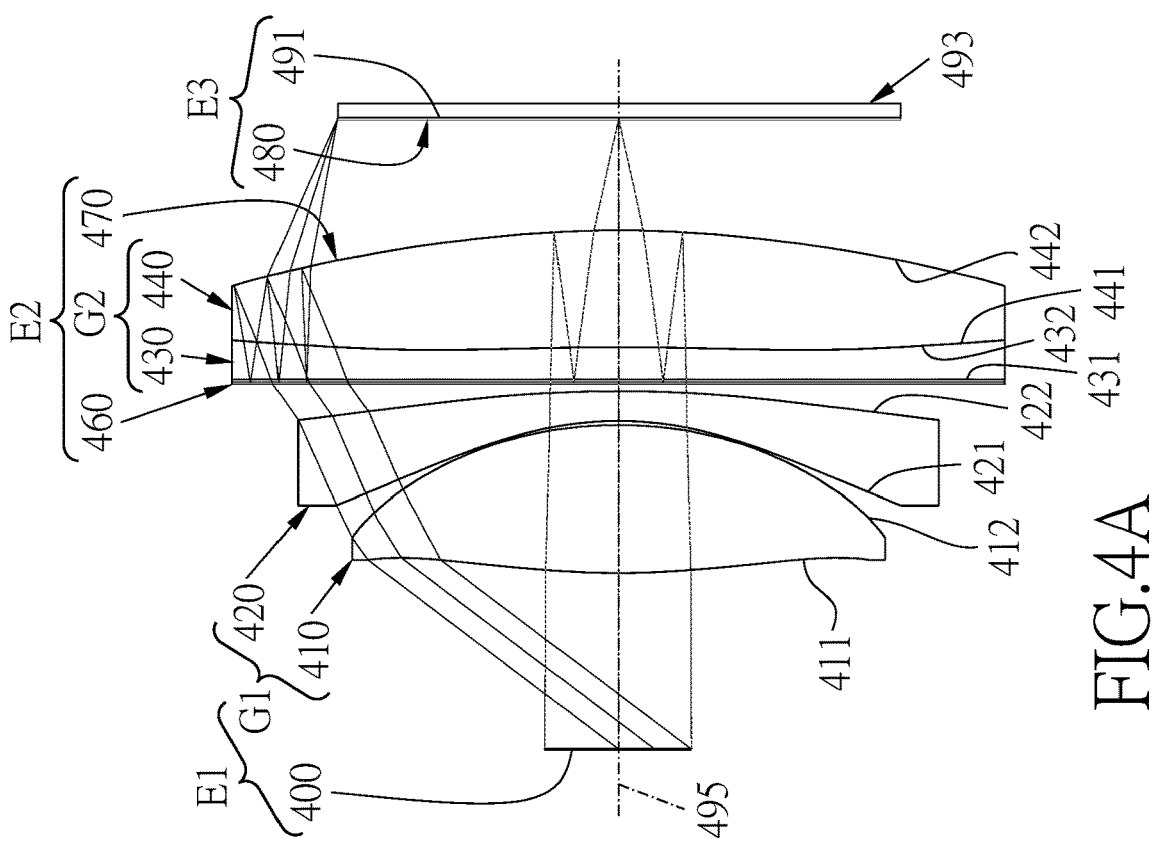
FIG.4A
FIG.4B

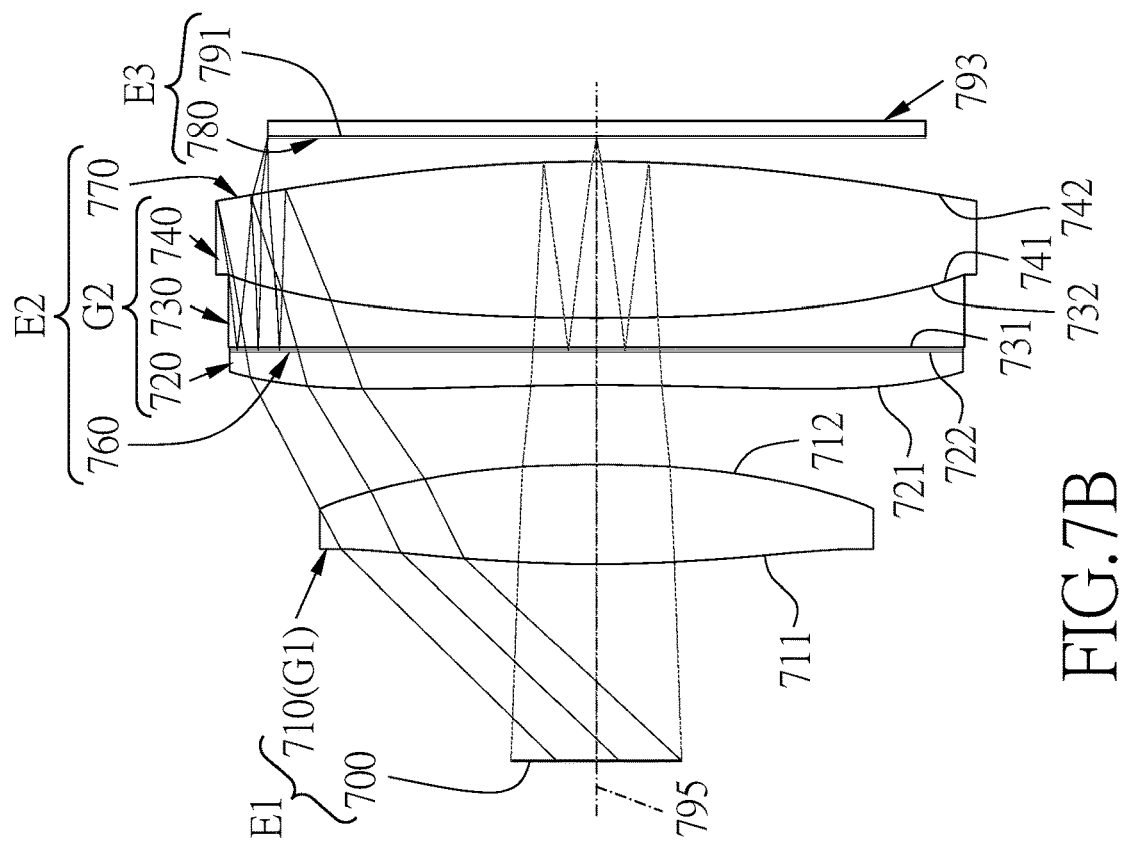
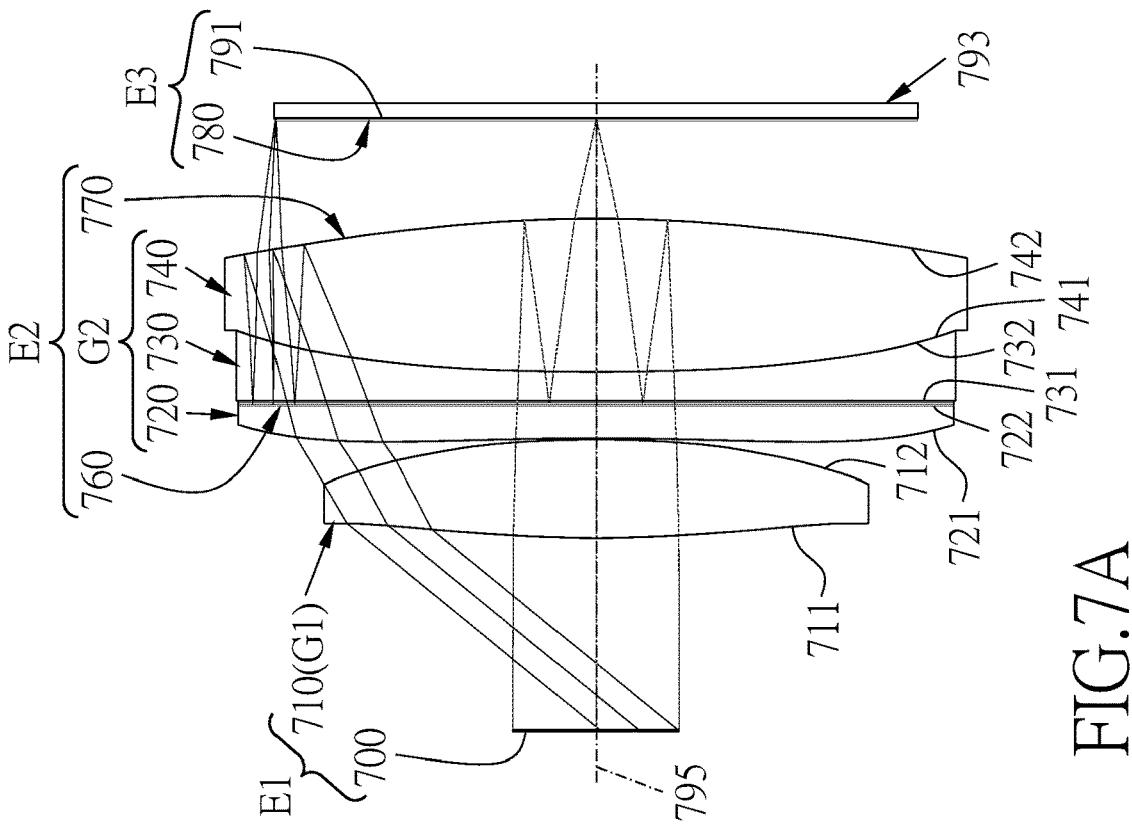

OPTICAL LENS ASSEMBLY AND HEAD-MOUNTED ELECTRONIC DEVICE

BACKGROUND

Field of the Invention

The present invention relates to an optical lens assembly and a head-mounted electronic device, and more particularly to an optical lens assembly applicable to head-mounted electronic devices.

Description of Related Art

With the development of the semiconductor industry, the functions of various consumer electronic products are increasingly powerful. Moreover, various services of the software application end emerge. These enables consumers to have more choices. Head-mounted displays emerge when the market is no longer satisfied with handheld electronic products. However, the current head-mounted displays are heavy and have poor image quality.

In addition, existing head-mounted displays are all fixed-focus designs, so users with myopia or hyperopia need to additionally wear their own glasses when using the head-mounted displays. This affects the wearing comfort of head-mounted displays and the experiences in the performance of the head-mounted displays.

The present invention mitigates and/or obviates the aforementioned disadvantages.

SUMMARY

The objective of the present invention is to provide an optical lens assembly and a head-mounted electronic device, which can reduce the weight of the device by folding the light path, provide a zoom function, allow users to use the device without additionally wearing their glasses, and ensure the image quality.

Therefore, an optical lens assembly in accordance with the present invention includes: a first element group including: a first lens group with positive refractive power, including one or two lenses; a second element group including: a second lens group with positive refractive power, including two or three lenses; an optical element including, in order from a visual side to an image source side: an absorptive polarizer, a reflective polarizer and a first phase retarder; and a partial-reflective-partial-transmissive element; and a third element group including: an image source plane. The first element group, the second element group and the third element group are arranged in order from the visual side to the image source side. A focal length of the first lens group is f_G1, a focal length of the second lens group is f_G2, a distance from a visual-side surface of the lens of the first lens group which is closest to the visual side, to an image source-side surface of the lens of the first lens group which is closest to the image source side, along an optical axis is CTG1, a distance from a visual-side surface of the lens of the second lens group which is closest to the visual side, to an image source-side surface of the lens of the second lens group which is closest to the image source side, along the optical axis is CTG2, a distance from the image source-side surface of the lens of the first lens group which is closest to the image source side, to the visual-side surface of the lens of the second lens group which is closest to the visual side, along the optical axis when the optical lens assembly focuses on a near point is T12_N, and the following conditions are satisfied: 0.10<f_G2/f_G1<1.44 and 1.11<(CTG1+CTG2)/T12_N<6.06.

When f_G2/f_G1 is satisfied, the distribution of the refractive power of the first lens group and the second lens group will be more appropriate, and the aberration can be reduced. When (CTG1+CTG2)/T12_N is satisfied, the field of view can be increase by the cooperation of the first lens group and the second lens group.

Optionally, the optical lens assembly has a total of three, four or five lenses with refractive power.

Optionally, the third element group further includes a second phase retarder, and the second phase retarder is disposed on the image source plane and is located between the second lens group and the image source plane.

Optionally, a radius of curvature of a visual-side surface of the lens of the second lens group which is closest to the image source side is G2R3, a radius of curvature of the image source-side surface of the lens of the second lens group which is closest to the image source side is G2R4, and the following condition is satisfied: −1.28<G2R4/G2R3<2.03, which is favorable to reducing the chromatic aberration and the aberration by the collocation of the radii of curvature.

Optionally, a focal length of the optical lens assembly focusing on the near point is f_N, a focal length of the optical lens assembly focusing on a far point is f_F, a distance from the visual-side surface of the lens of the first lens group which is closest to the visual side, to the image source plane along the optical axis is TL, a maximum image-source height of the optical lens assembly is IMH, and the following condition is satisfied: 1.04<f_N*TL/(f_F*IMH)<1.96, which is favorable to achieving a proper balance between the miniaturization of the optical lens assembly and the size of the light-emitting area of a display in the zoom range of the optical lens assembly.

Optionally, a maximum field of view of the optical lens assembly focusing on the near point is FOV_N, a maximum field of view of the optical lens assembly focusing on the far point is FOV_F, the distance from the image source-side surface of the lens of the first lens group which is closest to the image source side, to the visual-side surface of the lens of the second lens group which is closest to the visual side, along the optical axis when the optical lens assembly focuses on the near point is T12_N, a distance from the image source-side surface of the lens of the first lens group which is closest to the image source side, to the visual-side surface of the lens of the second lens group which is closest to the visual side, along the optical axis when the optical lens assembly focuses on the far point is T12_F, and the following condition is satisfied: −4.11°/mm<(FOV_F−FOV_N)/(T12_F−T12_N)<−1.61°/mm, which is favorable to achieving an optimal balance between the performance and miniaturization of the optical lens assembly in the zoom range of the optical lens assembly.

Optionally, the radius of curvature of the visual-side surface of the lens of the second lens group which is closest to the image source side is G2R3, the radius of curvature of the image source-side surface of the lens of the second lens group which is closest to the image source side is G2R4, and the following condition is satisfied: −23.15<(G2R3+G2R4)/(G2R3−G2R4)<2.82, which is favorable to narrowing the incident angle of light by adjusting the surface shapes of the lenses.

Optionally, the distance from the visual-side surface of the lens of the first lens group which is closest to the visual side, to the image source-side surface of the lens of the first lens group which is closest to the image source side, along the optical axis is CTG1, the distance from the visual-side surface of the lens of the second lens group which is closest to the visual side, to the image source-side surface of the lens of the second lens group which is closest to the image source side, along the optical axis is CTG2, and the following condition is satisfied: $0.66<CTG2/CTG1<2.82$, which is favorable to ensuring that the total length of the optical lens assembly can achieve the processing requirement of the manufacturing process of the lens device, while ensuring the image quality.

Optionally, the distance from the visual-side surface of the lens of the first lens group which is closest to the visual side, to the image source-side surface of the lens of the first lens group which is closest to the image source side, along the optical axis is CTG1, a radius of curvature of the visual-side surface of the lens of the first lens group which is closest to the visual side is G1R1, and the following condition is satisfied: $0.04<CTG1/G1R1<0.25$, which is favorable to ensuring that the total length of the optical lens assembly and the radii of curvature of the lenses can achieve the processing requirement of the manufacturing process of the lens device while ensuring the image quality.

Optionally, the distance from the visual-side surface of the lens of the second lens group which is closest to the visual side, to the image source-side surface of the lens of the second lens group which is closest to the image source side, along the optical axis is CTG2, a distance from the image source-side surface of the lens of the first lens group which is closest to the image source side, to the image source plane along the optical axis is MS1, and the following condition is satisfied: $1.17<MS1/CTG2<2.81$, which is favorable to achieving a balance between the movable space of the second lens group and the overall length of the second lens group, so as to widen the zoom range for satisfying the needs of most of myopic human eyes.

Optionally, the focal length of the first lens group is f_G1, the distance from the visual-side surface of the lens of the first lens group which is closest to the visual side, to the image source-side surface of the lens of the first lens group which is closest to the image source side, along the optical axis is CTG1, and the following condition is satisfied: $8.57<f\_G1/CTG1<19.17$, which is favorable to balancing the overall length and the refractive power of the first lens group to ensure that the forming of lenses can achieve the processing requirement of the manufacturing process.

Optionally, the focal length of the first lens group is f_G1, the focal length of the optical lens assembly focusing on the far point is f_F, and the following condition is satisfied: $0.11<f\_F/f\_G1<0.44$, which is favorable to shortening the total length of the optical lens assembly by the collocation of the focal length of the optical lens assembly with the focal length of the first lens group when the optical lens assembly focuses on the far point.

Optionally, the focal length of the first lens group is f_G1, the radius of curvature of the visual-side surface of the lens of the first lens group which is closest to the visual side is G1R1, and the following condition is satisfied: $0.57<f\_G1/G1R1<3.34$, which is favorable to adjusting the surface shape and the refractive power of the lens(es) of the first lens group to increase the field of view.

Optionally, the focal length of the second lens group is f_G2, the radius of curvature of the image source-side surface of the lens of the second lens group which is closest to the image source side is G2R4, and the following condition is satisfied: $-7.17<f\_G2/G2R4<-1.35$, which is favorable to adjusting the surface shapes and the refractive power of the lenses of the second lens group to reduce the aberration.

Optionally, the focal length of the second lens group is f_G2, a distance from the visual-side surface of the lens of the second lens group which is closest to the visual side, to the image source plane along the optical axis when the optical lens assembly focuses on the far point is MS2_F, and the following condition is satisfied: $0.03<MS2\_F/f\_G2<0.16$, which is favorable to achieving a proper balance between the lens formability and the refractive power of the second lens group.

Optionally, the maximum field of view of the optical lens assembly focusing on the near point is FOV_N, the maximum field of view of the optical lens assembly focusing on the far point is FOV_F, and the following condition is satisfied: $0.64<FOV\_N/FOV\_F<1.09$, which is favorable to satisfying the needs of most of presbyopia and myopic human eyes in the zoom range of the optical lens assembly.

Optionally, the focal length of the optical lens assembly focusing on the far point is f_F, the radius of curvature of the visual-side surface of the lens of the first lens group which is closest to the visual side is G1R1, a radius of curvature of the image source-side surface of the lens of the first lens group which is closest to the image source side is G1R2, and the following condition is satisfied: $-0.16<(f\_F/G1R1)+(f\_F/G1R2)<0.23$, which is favorable to distributing the surface shape of the lens(es) of the first lens group to correct the aberration and increase the field of view.

Optionally, the maximum field of view of the optical lens assembly focusing on the far point is FOV_F, the distance from the image source-side surface of the lens of the first lens group which is closest to the image source side, to the visual-side surface of the lens of the second lens group which is closest to the visual side, along the optical axis when the optical lens assembly focuses on the far point is T12_F, the maximum image-source height of the optical lens assembly is IMH, and the following condition is satisfied: $0.94°/mm^2<FOV\_F/(T12\_F*IMH)<62.28°/mm^2$, which is favorable to matching the size of the human eye visual field to achieve a better sense of immersion, and making the optical lens assembly lightweight.

Optionally, the distance from the visual-side surface of the lens of the first lens group which is closest to the visual side, to the image source-side surface of the lens of the first lens group which is closest to the image source side, along the optical axis is CTG1, the radius of curvature of the image source-side surface of the lens of the first lens group which is closest to the image source side is G1R2, and the following condition is satisfied: $-0.15<CTG1/G1R2<-0.03$, which is favorable to ensuring that the total length of the optical lens assembly and the radii of curvature of the lenses can achieve the processing requirement of the manufacturing process of the lens device while ensuring the image quality.

Optionally, the focal length of the second lens group is f_G2, the radius of curvature of the visual-side surface of the lens of the second lens group which is closest to the image source side is G2R3, and the following condition is satisfied: $-12.13<f\_G2/G2R3<3.07$, which is favorable to adjusting the surfaces shape and the refractive power of the lenses of the second lens group to reduce the aberration.

Optionally, the distance from the visual-side surface of the lens of the first lens group which is closest to the visual side, to the image source plane along the optical axis is TL, the maximum image-source height of the optical lens assembly is IMH, and the following condition is satisfied: $0.99<TL/$ IMH<1.92, which is favorable to achieving a balance between the total length of the optical lens assembly and the size of the effective light-emitting area of the display.

Moreover, a head-mounted electronic device in accordance with the present invention includes a housing, an optical lens assembly disposed in the housing, an image source disposed on an image source plane of the optical lens assembly in the housing, and a controller disposed in the housing and electrically connected to the image source. The optical lens assembly includes: a first element group including a first lens group with positive refractive power, including one or two lenses; a second element group including: a second lens group with positive refractive power, including two or three lenses; an optical element including, in order from a visual side to an image source side, an absorptive polarizer, a reflective polarizer and a first phase retarder; and a partial-reflective-partial-transmissive element; and a third element group including the image source plane. The first element group, the second element group and the third element group are arranged in order from the visual side to the image source side. A focal length of the first lens group is f_G1, a focal length of the second lens group is f_G2, a distance from a visual-side surface of the lens of the first lens group which is closest to the visual side, to an image source-side surface of the lens of the first lens group which is closest to the image source side, along an optical axis is CTG1, a distance from a visual-side surface of the lens of the second lens group which is closest to the visual side, to an image source-side surface of the lens of the second lens group which is closest to the image source side, along the optical axis is CTG2, a distance from the image source-side surface of the lens of the first lens group which is closest to the image source side, to the visual-side surface of the lens of the second lens group which is closest to the visual side, along the optical axis when the optical lens assembly focuses on a near point is T12_N, and the following conditions are satisfied: $0.10<f\_G2/f\_G1<1.44$ and $1.11<(CTG1+CTG2)/T12\_N<6.06$.

When f_G2/f_G1 is satisfied, the distribution of the refractive power of the first lens group and the second lens group will be more appropriate, and the aberration can be reduced. When (CTG1+CTG2)/T12_N is satisfied, the field of view can be increase by the cooperation of the first lens group and the second lens group.

Optionally, the optical lens assembly has a total of three, four or five lenses with refractive power.

Optionally, the third element group further includes a second phase retarder, and the second phase retarder is disposed on the image source plane and is located between the second lens group and the image source plane.

Optionally, a radius of curvature of a visual-side surface of the lens of the second lens group which is closest to the image source side is G2R3, a radius of curvature of the image source-side surface of the lens of the second lens group which is closest to the image source side is G2R4, and the following condition is satisfied: $-1.28<G2R4/G2R3<2.03$, which is favorable to reducing the chromatic aberration and the aberration by the collocation of the radii of curvature.

Optionally, a focal length of the optical lens assembly focusing on the near point is f_N, a focal length of the optical lens assembly focusing on a far point is f_F, a distance from the visual-side surface of the lens of the first lens group which is closest to the visual side, to the image source plane along the optical axis is TL, a maximum image-source height of the optical lens assembly is IMH, and the following condition is satisfied: $1.04<f\_N*TL/(f\_F*IMH)<1.96$, which is favorable to achieving a proper balance between the miniaturization of the optical lens assembly and the size of the light-emitting area of a display in the zoom range of the optical lens assembly.

Optionally, a maximum field of view of the optical lens assembly focusing on the near point is FOV_N, a maximum field of view of the optical lens assembly focusing on the far point is FOV_F, the distance from the image source-side surface of the lens of the first lens group which is closest to the image source side, to the visual-side surface of the lens of the second lens group which is closest to the visual side, along the optical axis when the optical lens assembly focuses on the near point is T12_N, a distance from the image source-side surface of the lens of the first lens group which is closest to the image source side, to the visual-side surface of the lens of the second lens group which is closest to the visual side, along the optical axis when the optical lens assembly focuses on the far point is T12_F, and the following condition is satisfied: $-4.11°/mm<(FOV\_F-FOV\_N)/(T12\_F-T12\_N)<-1.61°/mm$, which is favorable to achieving an optimal balance between the performance and miniaturization of the optical lens assembly in the zoom range of the optical lens assembly.

Optionally, the radius of curvature of the visual-side surface of the lens of the second lens group which is closest to the image source side is G2R3, the radius of curvature of the image source-side surface of the lens of the second lens group which is closest to the image source side is G2R4, and the following condition is satisfied: $-23.15<(G2R3+G2R4)/(G2R3-G2R4)<2.82$, which is favorable to narrowing the incident angle of light by adjusting the surface shapes of the lenses.

Optionally, the distance from the visual-side surface of the lens of the first lens group which is closest to the visual side, to the image source-side surface of the lens of the first lens group which is closest to the image source side, along the optical axis is CTG1, the distance from the visual-side surface of the lens of the second lens group which is closest to the visual side, to the image source-side surface of the lens of the second lens group which is closest to the image source side, along the optical axis is CTG2, and the following condition is satisfied: $0.66<CTG2/CTG1<2.82$, which is favorable to ensuring that the total length of the optical lens assembly can achieve the processing requirement of the manufacturing process of the lens device while ensuring the image quality.

Optionally, the distance from the visual-side surface of the lens of the first lens group which is closest to the visual side, to the image source-side surface of the lens of the first lens group which is closest to the image source side, along the optical axis is CTG1, a radius of curvature of the visual-side surface of the lens of the first lens group which is closest to the visual side is GIR1, and the following condition is satisfied: $0.04<CTG1/GIR1<0.25$, which is favorable to ensuring that the total length of the optical lens assembly and the radii of curvature of the lenses can achieve the processing requirement of the manufacturing process of the lens device while ensuring the image quality.

Optionally, the distance from the visual-side surface of the lens of the second lens group which is closest to the visual side, to the image source-side surface of the lens of the second lens group which is closest to the image source side, along the optical axis is CTG2, a distance from the image source-side surface of the lens of the first lens group which is closest to the image source side, to the image source plane along the optical axis is MS1, and the following condition is satisfied: $1.17<MS1/CTG2<2.81$, which is favorable to achieving a balance between the movable space of the second lens group and the overall length of the second lens group, so as to widen the zoom range for satisfying the needs of most of myopic human eyes.

Optionally, the focal length of the first lens group is f_G1, the distance from the visual-side surface of the lens of the first lens group which is closest to the visual side, to the image source-side surface of the lens of the first lens group which is closest to the image source side, along the optical axis is CTG1, and the following condition is satisfied: 8.57<f_G1/CTG1<19.17, which is favorable to balancing the overall length and the refractive power of the first lens group to ensure that the forming of lenses can achieve the processing requirement of the manufacturing process.

Optionally, the focal length of the first lens group is f_G1, the focal length of the optical lens assembly focusing on the far point is f_F, and the following condition is satisfied: 0.11<f_F/f_G1<0.44, which is favorable to shortening the total length of the optical lens assembly by the collocation of the focal length of the optical lens assembly with the focal length of the first lens group when the optical lens assembly focuses on the far point.

Optionally, the focal length of the first lens group is f_G1, the radius of curvature of the visual-side surface of the lens of the first lens group which is closest to the visual side is G1R1, and the following condition is satisfied: 0.57<f_G1/G1R1<3.34, which is favorable to adjusting the surface shape and the refractive power of the lens(es) of the first lens group to increase the field of view.

Optionally, the focal length of the second lens group is f_G2, the radius of curvature of the image source-side surface of the lens of the second lens group which is closest to the image source side is G2R4, and the following condition is satisfied: −7.17<f_G2/G2R4<−1.35, which is favorable to adjusting the surface shapes and refractive power of lenses of the second lens group to reduce the aberration.

Optionally, the focal length of the second lens group is f_G2, a distance from the visual-side surface of the lens of the second lens group which is closest to the visual side, to the image source plane along the optical axis when the optical lens assembly focuses on the far point is MS2_F, and the following condition is satisfied: 0.03<MS2_F/f_G2<0.16, which is favorable to achieving a proper balance between the lens formability and the refractive power of the second lens group.

Optionally, the maximum field of view of the optical lens assembly focusing on the near point is FOV_N, the maximum field of view of the optical lens assembly focusing on the far point is FOV_F, and the following condition is satisfied: 0.64<FOV_N/FOV_F<1.09, which is favorable to satisfying the needs of most of presbyopia and myopic human eyes in the zoom range of the optical lens assembly.

Optionally, the focal length of the optical lens assembly focusing on the far point is f_F, the radius of curvature of the visual-side surface of the lens of the first lens group which is closest to the visual side is G1R1, a radius of curvature of the image source-side surface of the lens of the first lens group which is closest to the image source side is G1R2, and the following condition is satisfied: −0.16<(f_F/G1R1)+(f_F/G1R2)<0.23, which is favorable to distributing the surface shape of the lens(es) of the first lens group to correct the aberration and increase the field of view.

Optionally, the maximum field of view of the optical lens assembly focusing on the far point is FOV_F, the distance from the image source-side surface of the lens of the first lens group which is closest to the image source side, to the visual-side surface of the lens of the second lens group which is closest to the visual side, along the optical axis when the optical lens assembly focuses on the far point is T12_F, the maximum image-source height of the optical lens assembly is IMH, and the following condition is satisfied: 0.94°/mm²<FOV_F/(T12_F*IMH)<62.28°/mm², which is favorable to matching the size of the human eye visual field to achieve a better sense of immersion, and making the optical lens assembly lightweight.

Optionally, the distance from the visual-side surface of the lens of the first lens group which is closest to the visual side, to the image source-side surface of the lens of the first lens group which is closest to the image source side, along the optical axis is CTG1, the radius of curvature of the image source-side surface of the lens of the first lens group which is closest to the image source side is G1R2, and the following condition is satisfied: −0.15<CTG1/G1R2<−0.03, which is favorable to ensuring that the total length of the optical lens assembly and the radii of curvature of the lenses can achieve the processing requirement of the manufacturing process of the lens device while ensuring the image quality.

Optionally, the focal length of the second lens group is f_G2, the radius of curvature of the visual-side surface of the lens of the second lens group which is closest to the image source side is G2R3, and the following condition is satisfied: −12.13<f_G2/G2R3<3.07, which is favorable to adjusting the surface shapes and the refractive power of the lenses of the second lens group to reduce the aberration.

Optionally, the distance from the visual-side surface of the lens of the first lens group which is closest to the visual side, to the image source plane along the optical axis is TL, the maximum image-source height of the optical lens assembly is IMH, and the following condition is satisfied: 0.99<TL/IMH<1.92, which is favorable to achieving a balance between the total length of the optical lens assembly and the size of the effective light-emitting area of the display.

Another optical lens assembly in accordance with the present invention includes, in order from a visual side to an image source side: a first element group being immobile when a focus of the optical lens assembly changes, and including a first lens group; a second element group being movable from the visual side to the image source side when the focus of the optical lens assembly is changed from a far point to a near point, and including: a second lens group including a lens including a visual-side surface and an image source-side surface at least one of which is flat surface, and a lens being the closest to the image source side and including an image source-side surface being convex; an optical element located on the flat surface of the second lens group; and a partial-reflective-partial-transmissive element located at the image source-side surface of the lens of the second lens group which is closest to the image source side; and a third element group being immobile when the focus of the optical lens assembly changes.

Optionally, the optical lens assembly has a total of three, four or five lenses with refractive power.

Optionally, the third element group further includes a second phase retarder.

Moreover, another head-mounted electronic device in accordance with the present invention includes a housing, an optical lens assembly disposed in the housing, an image source disposed on an image source plane of the optical lens assembly in the housing, and a controller disposed in the housing and electrically connected to the image source. The optical lens assembly includes, in order from a visual side to an image source side: a first element group being immobile when a focus of the optical lens assembly changes, and including a first lens group; a second element group being movable from the visual side to the image source side when the focus of the optical lens assembly is changed from a far point to a near point, and including: a second lens group including a lens including a visual-side surface and an image source-side surface at least one of which is flat surface, and a lens being the closest to the image source side and including an image source-side surface being convex; an optical element located on the flat surface of the second lens group; and a partial-reflective-partial-transmissive element located at the image source-side surface of the lens of the second lens group which is closest to the image source side; and a third element group being immobile when the focus of the optical lens assembly changes.

Optionally, the optical lens assembly has a total of three, four or five lenses with refractive power.

Optionally, the third element group further includes a second phase retarder.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 4A is a schematic diagram of an optical lens assembly focusing on a far point in accordance with a fourth embodiment of the present invention;

FIG. 4B is a schematic diagram of the optical lens assembly focusing on a near point in accordance with the fourth embodiment of the present invention;

FIG. 7A is a schematic diagram of an optical lens assembly focusing on a far point in accordance with a seventh embodiment of the present invention;

FIG. 7B is a schematic diagram of the optical lens assembly focusing on a near point in accordance with the seventh embodiment of the present invention;

DETAILED DESCRIPTION

First Embodiment

Figure 1A:
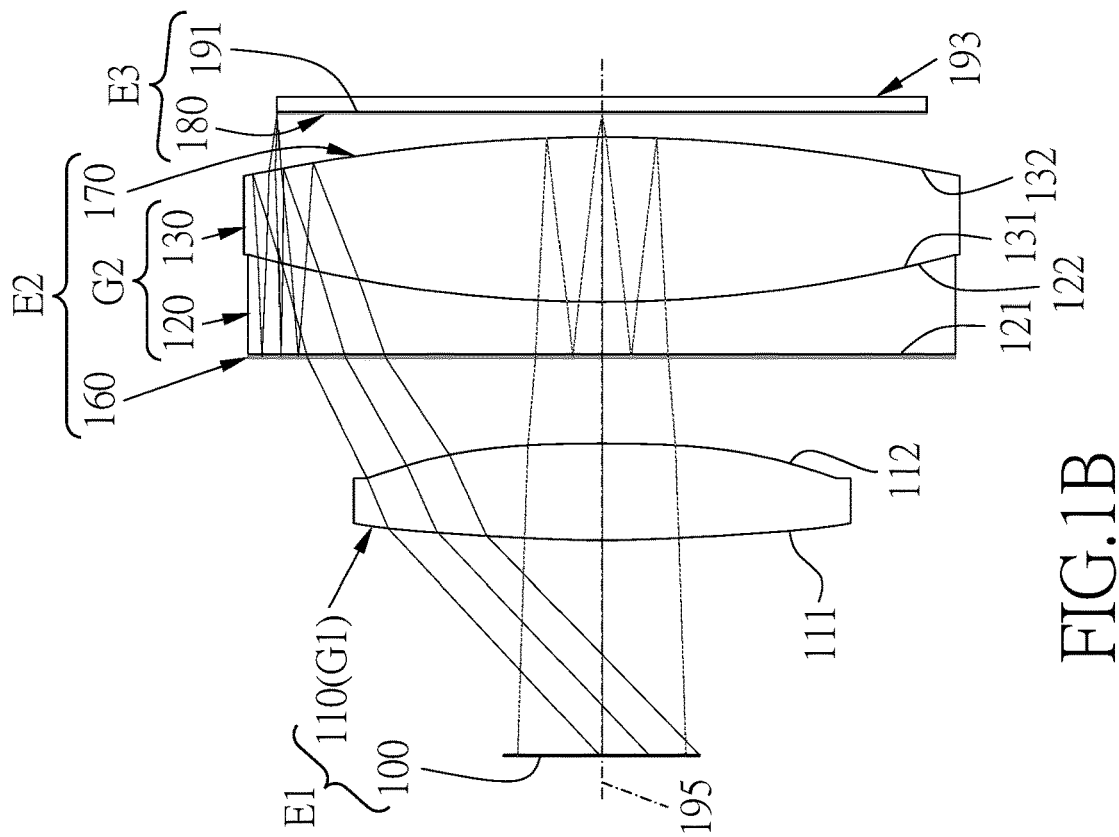
FIG. 1A is a schematic diagram of an optical lens assembly focusing on a far point in accordance with a first embodiment of the present invention.
Figure 1B:
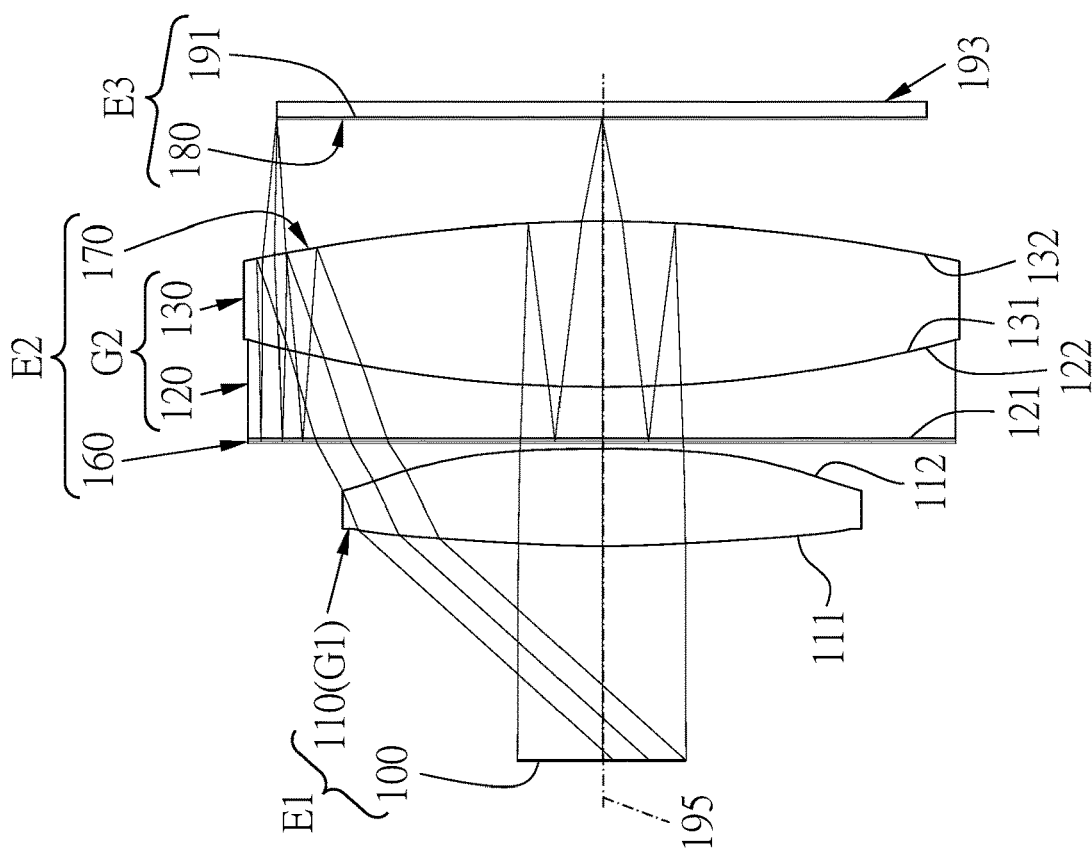
FIG. 1B is a schematic diagram of the optical lens assembly focusing on a near point in accordance with the first embodiment of the present invention.
Figure 1C:
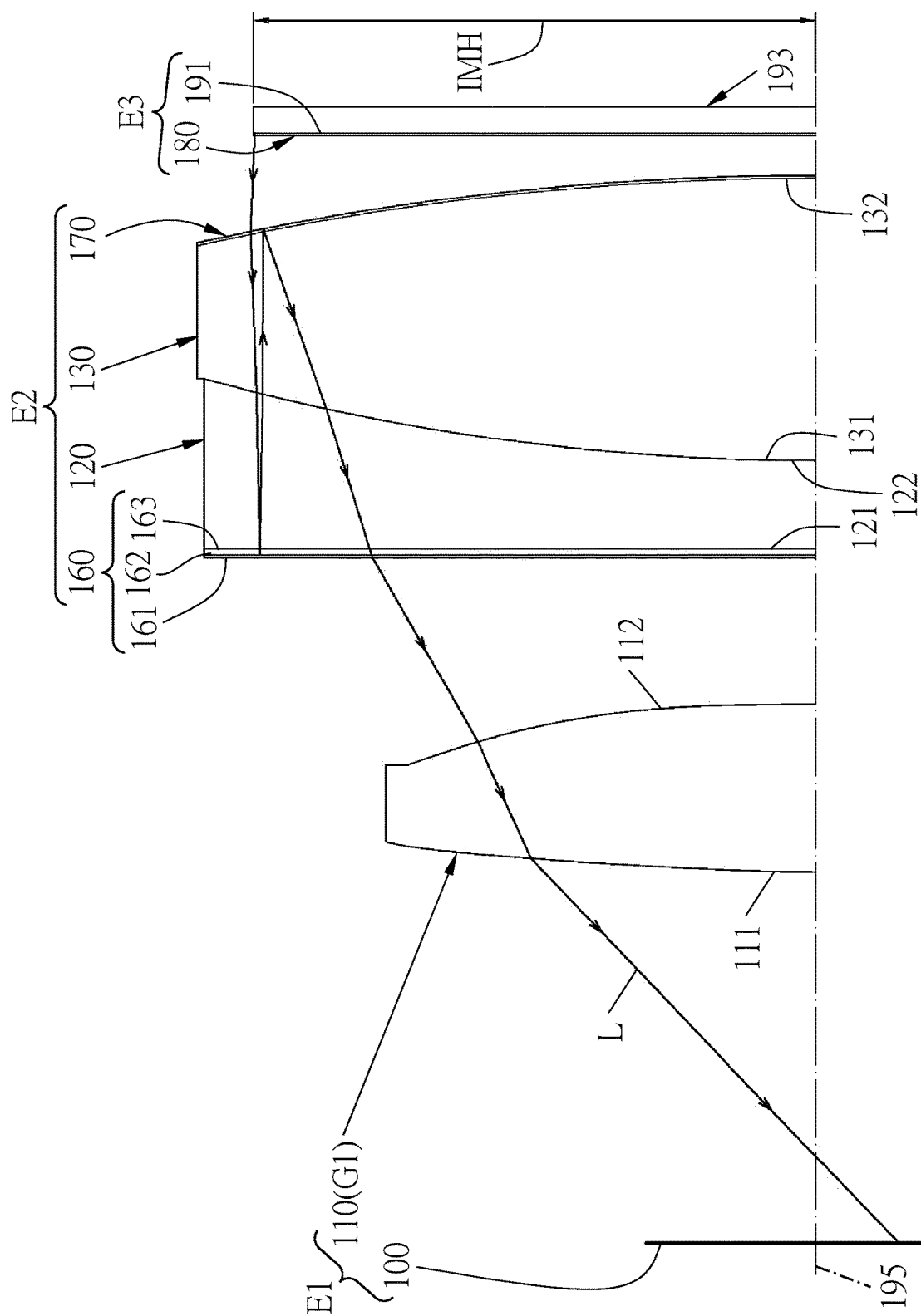
FIG. 1C is a schematic diagram of a part of the optical lens assembly of FIG. 1B with a light path therein.

Referring to FIGS. 1A to 1C, an optical lens assembly in accordance with a first embodiment of the present invention includes, in order from a visual side to an image source side along an optical axis 195: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of three lenses with refractive power, but is not limited thereto.

The first element group E1 includes, in order from the visual side to the image source side along the optical axis 195: a stop 100 and a first lens group G1.

The stop 100 may be located in a position where the user's eyes view an image.

The first lens group G1 with positive refractive power includes only a first lens 110. The first lens 110 with positive refractive power includes a visual-side surface 111 and an image source-side surface 112, the visual-side surface 111 of the first lens 110 is convex in a paraxial region thereof, the image source-side surface 112 of the first lens 110 is convex in a paraxial region thereof, the visual-side surface 111 and the image source-side surface 112 of the first lens 110 are aspheric, and the first lens 110 is made of plastic.

The second element group E2 includes, in order from the visual side to the image source side along the optical axis 195: an optical element 160, a second lens group G2 and a partial-reflective-partial-transmissive element 170.

The second lens group G2 with positive refractive power includes, in order from the visual side to the image source side along the optical axis 195: a second lens 120 and a third lens 130.

The second lens 120 with negative refractive power includes a visual-side surface 121 and an image source-side surface 122, the visual-side surface 121 of the second lens 120 is flat in a paraxial region thereof, the image source-side surface 122 of the second lens 120 is concave in a paraxial region thereof, the image source-side surface 122 of the second lens 120 is spherical, and the second lens 120 is made of plastic.

The third lens 130 with positive refractive power includes a visual-side surface 131 and an image source-side surface 132, the visual-side surface 131 of the third lens 130 is convex in a paraxial region thereof, the image source-side surface 132 of the third lens 130 is convex in a paraxial region thereof, the visual-side surface 131 of the third lens 130 is spherical, the image source-side surface 132 of the third lens 130 is aspheric, and the second lens 130 is made of plastic.

The second lens 120 and the third lens 130 together form a cemented doublet lens.

The first optical element 160 is located on the visual-side surface 121 of the second lens 120 and includes, in order from the visual side to the image source side along the optical axis 195: an absorptive polarizer 161, a reflective polarizer 162 and a first phase retarder 163. These three elements are stacked, and the two opposite surfaces of each of these three elements are flat. Specifically, the first phase retarder 163 is located on the visual-side surface 121, the reflective polarizer 162 is located on the first phase retarder 163, and the absorptive polarizer 161 is located on the reflective polarizer 162. The first phase retarder 163 is, for example, but not limited to, a quarter-wave plate.

The partial-reflective-partial-transmissive element 170 is located on the image source-side surface 132 of the third lens 130 and has an average light reflectance of at least 30%, preferably 50%, in the visible light range. The average light reflectance here is an average value of different reflectance of the partial-reflective-partial-transmissive element 170 for different wavelengths.

The third element group E3 includes, in order from the visual side to the image source side along the optical axis 195: a second phase retarder 180 and an image source plane 191.

The second phase retarder 180 is disposed on the image source plane 191 and located between the partial-reflective-partial-transmissive element 170 and the image source plane 191. The second phase retarder 180 is, for example, but not limited to, a quarter-wave plate.

The optical lens assembly works in cooperation with an image source 193 disposed on the image source plane 191. The image source plane 191 is located between the second phase retarder 180 and the image source 193. In the present embodiment, the type of the image source 193 is, for example, but not limited to, a liquid crystal display. However, in other embodiments, if the type of the image source 193 is an OLED display, a LED display, or other displays that can emit circularly-polarized light, the second phase retarder 180 may be omitted.

The equation for the aspheric surface profiles of the respective lenses of the first embodiment is expressed as follows:

$$z(h) = \frac{ch^2}{1 + [1 - (k+1)c^2 h^2]^{0.5}} + \sum (A_i) \cdot (h^i)$$

wherein:
z represents the value of a reference position at a height of h with respect to a vertex of the surface of a lens along the optical axis 195;
c represents a paraxial curvature (i.e., a curvature of a lens surface in a paraxial region thereof) equal to 1/R (R: a paraxial radius of curvature);
h represents a vertical distance from the point on the curve of the aspheric surface to the optical axis 195;
k represents the conic constant; and
$A_i$ represents the ith-order aspheric coefficient.

The optical lens assembly of the first embodiment utilizes the configuration and arrangement of the absorptive polarizer, the reflective polarizer, the phase retarders, the partial-reflective-partial-transmissive element and the lenses to fold the light path thereof by the transmission and reflection of light to shorten the length of the optical lens assembly required for forming an image without affecting the image quality. Referring to a light path L in FIG. 1C, a component of the circularly-polarized light traveling from the third element group E3 and being incident on the partial-reflective-partial-transmissive element 170 of the second element group E2 serves as a circularly-polarized transmitted light component to pass through the partial-reflective-partial-transmissive element 170 and then travel to the first phase retarder 163. When the circularly-polarized transmitted light component passes through the first phase retarder 163, this circularly-polarized transmitted light component turns to a linearly-polarized transmitted light component with a polarization direction parallel to the reflection axis of the reflective polarizer 162. This linearly-polarized transmitted light component leaving the first phase retarder 163 is then reflected back to the first phase retarder 163 by the reflective polarizer 162 to pass through the first phase retarder 163 and turn to primary reflected light of circular-polarization. Then, when the primary reflected light of circular polarization departing from the first phase retarder 163 travels to the partial-reflective-partial-transmissive element 170, a portion of the primary reflected light of circular polarization is reflected as a secondary reflected light of circular polarization by the partial-reflective-partial-transmissive element 170 to the first phase retarder 163. The secondary reflected light of circular polarization being incident on the first phase retarder 163 passes through the first phase retarder 163 to turn to secondary reflected light of linear polarization with a polarization direction perpendicular to the reflection axis of the reflective polarizer 162. Finally, the secondary reflected light of linear polarization leaving the first phase retarder 163 travels to the user's eyes to form the image after passing through the reflective polarizer 162 and the first absorptive polarizer 161.

Please refer to Tables 1 to 4, Table 1 shows the detailed optical data of the elements of the optical lens assembly of the first embodiment, Table 2 shows the aspheric coefficients of the lenses of the first embodiment, Table 3 shows the remaining parameters of the optical lens assembly of the first embodiment and the values thereof, and the values of the parameters in Tables 1 and 3 satisfy the conditional formulas of Table 4. A focal length of the optical lens assembly focusing on the near point is f_N, a focal length of the optical lens assembly focusing on the far point is f_F, a focal length of the first lens group is f_G1, a focal length of the second lens group is f_G2, a focal length of the first lens 110 is f1, a focal length of the second lens 120 is f2, a focal length of the third lens 130 is f3, a distance from the image source-side surface of the lens of the first lens group G1 which is closest to the image source side, to the visual-side surface of the lens of the second lens group G2 which is closest to the visual side, along the optical axis 195 when the optical lens assembly focuses on the near point is T12_N, a distance from the image source-side surface of the lens of the first lens group G1 which is closest to the image source side, to the visual-side surface of the lens of the second lens group G2 which is closest to the visual side, along the optical axis 195 when the optical lens assembly focuses on the far point is T12_F, a distance from a visual-side surface of the lens of the first lens group G1 which is closest to the visual side, to the image source-side surface of the lens of the first lens group G1 which is closest to the image source side, along the optical axis 195 is CTG1, a distance from the visual-side surface of the lens of the second lens group G2 which is closest to the visual side, to an image source-side surface of the lens of the second lens group G2 which is closest to the image source side, along the optical axis 195 is CTG2, a distance from the image source-side surface of the lens of the first lens group G1 which is closest to the image source side, to the image source plane 191 along the optical axis 195 is MS1, a distance from the visual-side surface of the lens of the second lens group G2 which is closest to the visual side, to the image source plane 191 along the optical axis 195 when the optical lens assembly focuses on the far point is MS2_F, a radius of curvature of the visual-side surface of the lens of the first lens group G1 which is closest to the visual side is G1R1, a radius of curvature of the image source-side surface of the lens of the first lens group G1 which is closest to the image source side is G1R2, a radius of curvature of a visual-side surface of the lens of the second lens group G2 which is closest to the image source side is G2R3, a radius of curvature of the image source-side surface of the lens of the second lens group G2 which is closest to the image source side is G2R4, a distance from the visual-side surface of the lens of the first lens group G1 which is closest to the visual side, to the image source plane 191 along the optical axis 195 is TL, a maximum image-source height (usually denotes the radius of the incircle of the effective light emitting region of the display) of the optical lens assembly is IMH.

TABLE 1

Embodiment 1
Near point: f_N = 25.45 mm, EPD(entrance pupil diameter) = 10.00 mm, FOV_N = 90.0°
Far point: f_F = 24.34 mm, EPD (entrance pupil diameter) = 10.00 mm, FOV_F = 99.5°

| Surface | | Curvature Radius | Thickness/gap | Refractive Index (nd) | Abbe number (vd) | Refraction/reflection |
|---|---|---|---|---|---|---|
| 0 | Stop | Infinity | 12.000 | — | — | — |
| 1 | First lens | 68.053 | 5.395 | 1.544 | 55.9 | Refraction |
| 2 | | −148.198 | 4.730(Near point) 0.300(Far point) | — | — | Refraction |
| 3 | Absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.841 | 1.645 | 23.4 | Refraction |
| 7 | Third lens | 84.418 | 9.226 | 1.544 | 55.9 | Refraction |
| 8 | Partial-reflective-partial-transmissive element | −89.958 | −9.226 | 1.544 | 55.9 | Reflection |
| 9 | Second lens | 84.418 | −2.841 | 1.645 | 23.4 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | 1.533 | 56.0 | Reflection |
| 13 | First phase retarder | Infinity | 0.100 | 1.533 | 56.0 | Refraction |
| 14 | Second lens | Infinity | 2.841 | 1.645 | 23.4 | Refraction |
| 15 | Third lens | 84.418 | 9.226 | 1.544 | 55.9 | Refraction |
| 16 | | −89.958 | 1.273(Near point) 5.703(Far point) | — | — | Refraction |
| 17 | Second phase retarder | Infinity | 0.100 | 1.533 | 56.0 | Refraction |
| 18 | Image source plane | Infinity | — | — | — | — |

The reference wavelength is 555 nm.

TABLE 2

Embodiment 1
Aspheric coefficients

| Surface | 1 | 2 | 6, 10, 14 | 7, 9, 15 | 8, 16 |
|---|---|---|---|---|---|
| K: | 6.4506E+00 | −2.4258E+01 | 0.0000E+00 | 0.0000E+00 | −2.1561E+01 |
| A2: | 0.0000E+00 | 0.0000E+00 | 0.0000E+00 | 0.0000E+00 | 0.0000E+00 |
| A4: | −7.7525E−05 | −8.0096E−05 | 0.0000E+00 | 0.0000E+00 | 2.3990E−07 |
| A6: | 1.0226E−06 | 4.7232E−07 | 0.0000E+00 | 0.0000E+00 | −3.2009E−09 |
| A8: | −1.0507E−08 | −1.6122E−09 | 0.0000E+00 | 0.0000E+00 | 3.7419E−13 |
| A10: | 7.1622E−11 | −3.9444E−12 | 0.0000E+00 | 0.0000E+00 | 9.4705E−15 |
| A12: | −2.9981E−13 | 6.6104E−14 | 0.0000E+00 | 0.0000E+00 | −7.5134E−18 |
| A14: | 6.9916E−16 | −2.5460E−16 | 0.0000E+00 | 0.0000E+00 | −2.4020E−20 |
| A16: | −6.7398E−19 | 3.6511E−19 | 0.0000E+00 | 0.0000E+00 | 2.8501E−23 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

TABLE 3

Embodiment 1

| | | | | | |
|---|---|---|---|---|---|
| f_G1 [mm] | 86.18 | CTG2 [mm] | 12.07 | G2R3 [mm] | 84.42 |
| f_G2 [mm] | 202.48 | MS1 [mm] | 18.47 | G2R4 [mm] | −89.96 |
| T12_N [mm] | 5.03 | MS2_F [mm] | 17.87 | TL [mm] | 23.87 |
| T12_F [mm] | 0.60 | G1R1 [mm] | 68.05 | IMH [mm] | 19.25 |
| CTG1 [mm] | 5.40 | G1R2 [mm] | −148.20 | f1 [mm] | 86.18 |
| f2 [mm] | −130.88 | f3 [mm] | 81.28 | — | — |

TABLE 4

Embodiment 1

| | | | |
|---|---|---|---|
| f_G1/f_G2 | 0.43 | f_G1/CTG1 | 15.97 |
| (CTG1 + CTG2)/T12_N | 3.47 | f_F/f_G1 | 0.28 |
| G2R4/G2R3 | −1.07 | f_G1/G1R1 | 1.27 |
| f_N*TL/(f_F*IMH) | 1.30 | f_G2/G2R3 | 2.40 |
| (FOV_F − FOV_N)/(T12_F − T12_N)[°/mm] | −2.14 | f_G2/G2R4 | −2.25 |
| (G2R3 + G2R4)/(G2R3 − G2R4) | −0.03 | MS2_F/f_G2 | 0.09 |
| CTG2/CTG1 | 2.24 | FOV_N/FOV_F | 0.90 |
| CTG1/G1R1 | 0.08 | (f_F/G1R1) + (f_F/G1R2) | 0.19 |
| CTG1/G1R2 | −0.04 | FOV_F/(T12_F*IMH) [°/mm$^2$] | 8.61 |
| MS1/CTG2 | 1.53 | TL/IMH | 1.24 |

In Table 1, the units of the radius of curvature, the thickness, the gap and the focal length are expressed in mm, and the surface numbers 18-0 respectively represent the surfaces where light travels to, from the image source plane 191 to the stop 100, wherein the surface 0 represents a gap between the stop 100 (or the user's eyes) and the first lens 110 along the optical axis 195; the surface 1 represents the central thickness of the first lens 110 along the optical axis 195; the surface 2 represents a gap between the first lens 110 and the absorptive polarizer 161 along the optical axis 195; the surface 3 represents the thickness of the absorptive polarizer 161 along the optical axis 195; the surfaces 4, 11 and 12 represent the thickness of the reflective polarizer 162 along the optical axis 195; the surfaces 5, 10 and 13 represent the thickness of the first phase retarder 163 along the optical axis 195; the surfaces 6, 9 and 14 represent the central thickness of the second lens 120 along the optical axis 195; the surfaces 7 and 15 represent the center thickness of the third lens 130 along the optical axis 195; the surface 8 represents a distance that the light reflected by the partial-reflective-partial-transmissive element 170 travels within the third lens 130, and this distance is equal to the central thickness of the third lens 130 along the optical axis 195; the surface 16 represents a gap between the third lens 130 and the second phase retarder 180 along the optical axis 195; the surface 17 represents the thickness of the second phase retarder 180 along the optical axis 195; the surface 18 represents a gap between the second phase retarder 180 and the image source plane 191 along the optical axis 195; and a respective thickness or gap with a positive sign in the table 1 denotes the transmission direction of light is toward the stop 100, and a respective thickness or gap having a negative sign in the table 1 denotes the transmission direction of light is toward the image source plane 191.

In table 2, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic diagram of this embodiment, and the definitions of parameters in the tables are the same as those in Tables 1 to 4 of the first embodiment. Therefore, an explanation in this regard will not be provided again. The definitions of the surface numbers in Table 1 may change with the number of lenses and the position of the optical elements in other embodiments, and the relevant descriptions in the embodiments may be referred to the definitions of the surface numbers in Table 1 and will not be provided again.

Second Embodiment

Figure 2B:
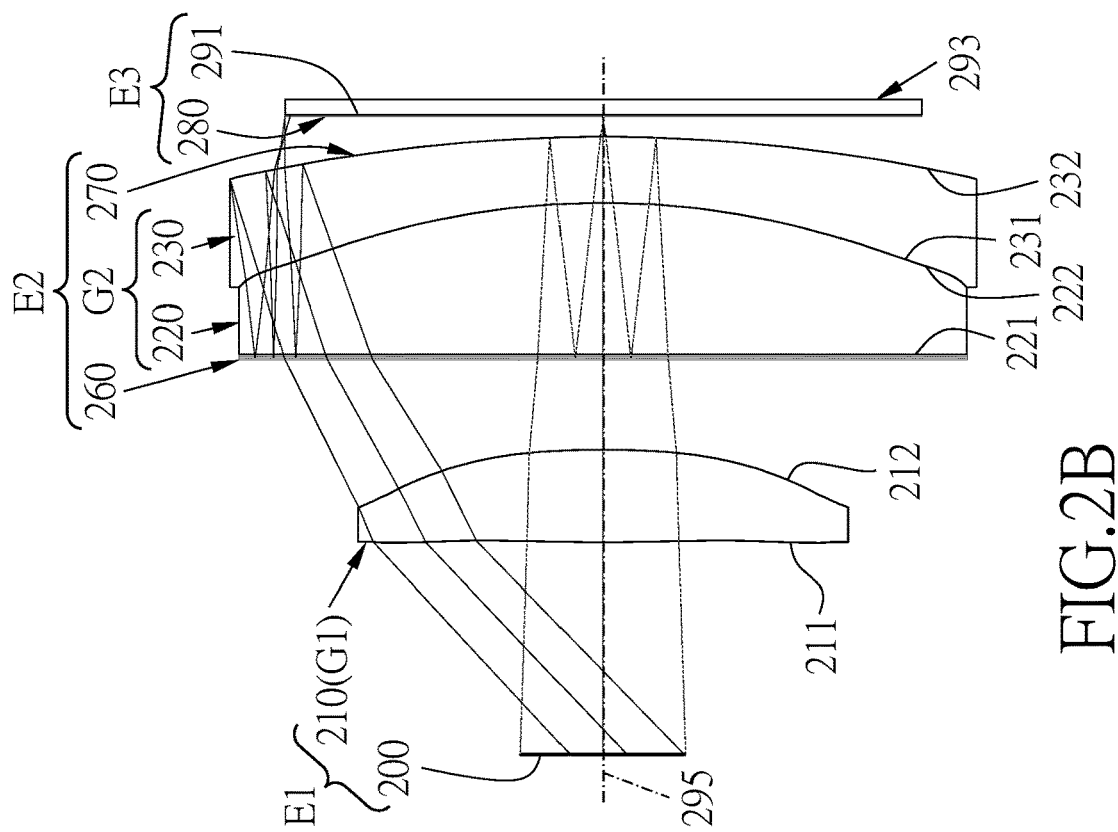
FIG. 2B is a schematic diagram of the optical lens assembly focusing on a near point in accordance with the second embodiment of the present invention.
Figure 2A:
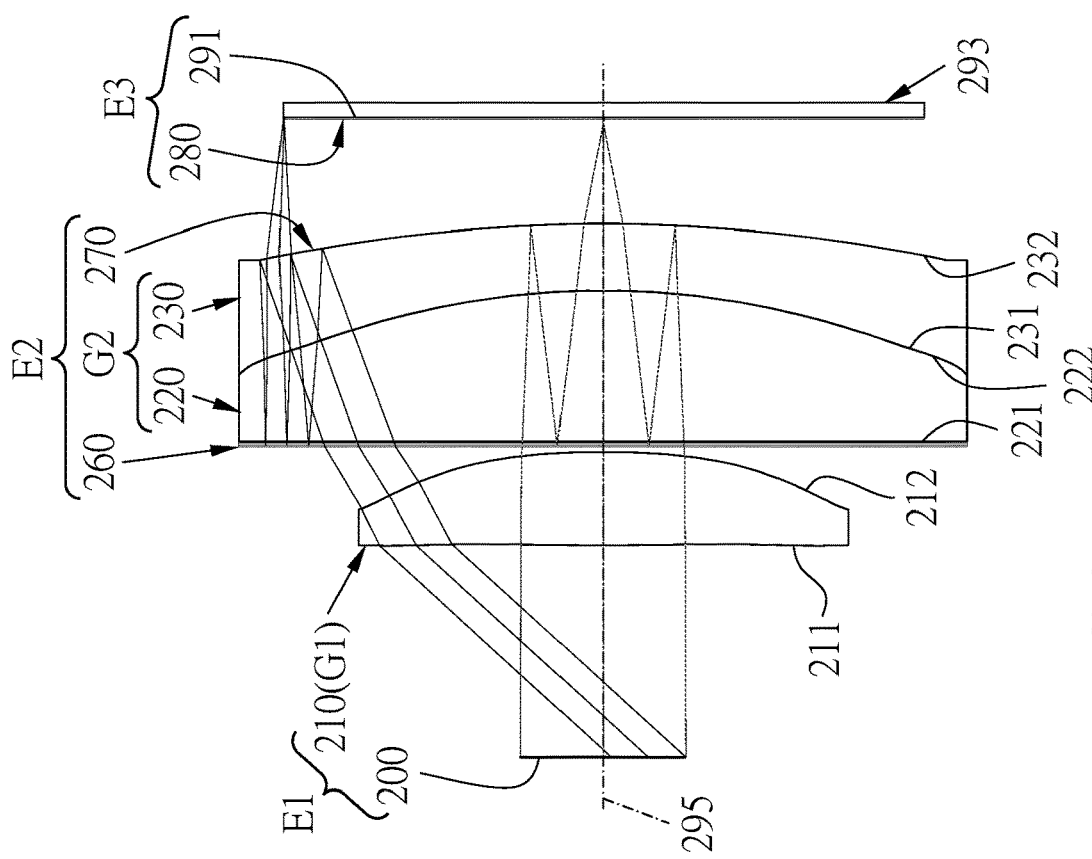
FIG. 2A is a schematic diagram of an optical lens assembly focusing on a far point in accordance with a second embodiment of the present invention.

Referring to FIGS. 2A and 2B, an optical lens assembly in accordance with a second embodiment of the present invention includes, in order from a visual side to an image source side along an optical axis 295: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of three lenses with refractive power, but is not limited thereto.

The first element group E1 includes, in order from the visual side to the image source side along the optical axis 295: a stop 200 and a first lens group G1.

The stop 200 may be located in a position where the user's eyes view an image.

The first lens group G1 with positive refractive power includes only a first lens 210. The first lens 210 with positive refractive power includes a visual-side surface 211 and an image source-side surface 212, the visual-side surface 211 of the first lens 210 is convex in a paraxial region thereof, the image source-side surface 212 of the first lens 210 is convex in a paraxial region thereof, the visual-side surface 211 and the image source-side surface 212 of the first lens 210 are aspheric, and the first lens 210 is made of plastic.

The second element group E2 includes, in order from the visual side to the image source side along the optical axis

295: an optical element 260, a second lens group G2 and a partial-reflective-partial-transmissive element 270.

The second lens group G2 with positive refractive power includes, in order from the visual side to the image source side along the optical axis 295: a second lens 220 and a third lens 230.

The second lens 220 with positive refractive power includes a visual-side surface 221 and an image source-side surface 222, the visual-side surface 221 of the second lens 220 is flat in a paraxial region thereof, the image source-side surface 222 of the second lens 220 is convex in a paraxial region thereof, the image source-side surface 222 of the second lens 220 is aspheric, and the second lens 220 is made of plastic.

The third lens 230 with negative refractive power includes a visual-side surface 231 and an image source-side surface 232, the visual-side surface 231 of the third lens 230 is concave in a paraxial region thereof, the image source-side surface 232 of the third lens 230 is convex in a paraxial region thereof, the visual-side surface 231 and the image source-side surface 232 of the third lens 230 are aspheric, and the second lens 230 is made of plastic.

The second lens 220 and the third lens 230 together form a cemented doublet lens.

The first optical element 260 is located on the visual-side surface 221 of the second lens 220, and the configuration of the optical element 260 is the same as that of the optical element 160 of the first embodiment and will not be explained again.

The partial-reflective-partial-transmissive element 270 is located on the image source-side surface 232 of the third lens 230, and the configuration of the partial-reflective-partial-transmissive element 270 is the same as that of the partial-reflective-partial-transmissive element 170 of the first embodiment and will not be explained again.

The third element group E3 includes, in order from the visual side to the image source side along the optical axis 295: a second phase retarder 280 and an image source plane 291.

The configuration of the second phase retarder 280 is the same as that of the second phase retarder 180 of the first embodiment and will not be explained again.

The optical lens assembly works in cooperation with an image source 293 disposed on the image source plane 291. The image source plane 291 is located between the second phase retarder 280 and the image source 293. In the present embodiment, the type of the image source 293 is, for example, but not limited to, a liquid crystal display. However, in other embodiments, if the type of the image source 293 is an OLED display, a LED display, or other displays that can emit circularly-polarized light, the second phase retarder 280 may be omitted.

Please refer to Tables 5 to 8, Table 5 shows the detailed optical data of the elements of the optical lens assembly of the second embodiment, Table 6 shows the aspheric coefficients of the lenses of the second embodiment, Table 7 shows the remaining parameters of the optical lens assembly of the second embodiment and the values thereof, and the values of the parameters in Tables 5 and 7 satisfy the conditional formulas of Table 8. In the second embodiment, the equation of the aspheric surface profiles of the aforementioned lenses is the same as the equation of the aspheric surface profiles of the aforementioned lenses in the first embodiment. The definitions of the surfaces in Table 5 can be referred to the relevant description of Table 1 and will not be explained again.

TABLE 5

Embodiment 2
Near point: f_N = 25.91 mm, EPD(entrance pupil diameter) = 10.00 mm, FOV_N = 90.0°
Far point: f_F = 24.66 mm, EPD (entrance pupil diameter) = 10.00 mm, FOV_F = 100.0°

| Surface | | Curvature Radius | Thickness/gap | Refractive Index (nd) | Abbe number (vd) | Refraction/ reflection |
|---|---|---|---|---|---|---|
| 0 | Stop | Infinity | 12.000 | — | — | — |
| 1 | First lens | 114.783 | 5.251 | 1.544 | 55.9 | refraction |
| 2 | | −70.920 | 5.090(Near point) 0.300(Far point) | — | — | refraction |
| 3 | Absorptive polarizer | Infinity | 0.100 | 1.533 | 56.0 | refraction |
| 4 | Reflective polarizer | Infinity | 0.100 | 1.533 | 56.0 | refraction |
| 5 | First phase retarder | Infinity | 0.100 | 1.533 | 56.0 | refraction |
| 6 | Second lens | Infinity | 8.559 | 1.544 | 55.9 | refraction |
| 7 | Third lens | −70.046 | 3.787 | 1.661 | 21.0 | refraction |
| 8 | Partial-reflective-partial-transmissive element | −98.349 | −3.787 | 1.661 | 21.0 | reflection |
| 9 | Second lens | −70.046 | −8.559 | 1.544 | 55.9 | refraction |
| 10 | First phase retarder | Infinity | −0.100 | 1.533 | 56.0 | refraction |
| 11 | Reflective polarizer | Infinity | −0.100 | 1.533 | 56.0 | refraction |
| 12 | Reflective polarizer | Infinity | 0.100 | 1.533 | 56.0 | reflection |
| 13 | First phase retarder | Infinity | 0.100 | 1.533 | 56.0 | refraction |
| 14 | Second lens | Infinity | 8.559 | 1.544 | 55.9 | refraction |
| 15 | Third lens | −70.046 | 3.787 | 1.661 | 21.0 | refraction |
| 16 | | −98.349 | 1.083(Near point) 5.873(Far point) | — | — | refraction |
| 17 | Second phase retarder | Infinity | 0.100 | 1.533 | 56.0 | refraction |
| 18 | Image source plane | Infinity | — | — | — | — |

The reference wavelength is 555 nm.

TABLE 6

Embodiment 2
Aspheric Coefficients

| Surface | 1 | 2 | 6, 10, 14 | 7, 9, 15 | 8, 16 |
|---|---|---|---|---|---|
| K: | −8.4795E+00 | 4.8915E+00 | 0.0000E+00 | 1.3411E+00 | 3.4004E+00 |
| A2: | 0.0000E+00 | 0.0000E+00 | 0.0000E+00 | 0.0000E+00 | 0.0000E+00 |
| A4: | −1.0458E−04 | −1.0951E−04 | 0.0000E+00 | −8.0111E−05 | −9.5783E−07 |
| A6: | 1.9169E−06 | 1.3655E−06 | 0.0000E+00 | 1.0501E−06 | 5.4980E−08 |
| A8: | −2.8770E−08 | −1.7617E−08 | 0.0000E+00 | −7.0510E−09 | −3.9620E−10 |
| A10: | 2.7359E−10 | 1.5101E−10 | 0.0000E+00 | 2.6831E−11 | 1.4457E−12 |
| A12: | −1.5173E−12 | −7.6414E−13 | 0.0000E+00 | −5.9221E−14 | −2.9684E−15 |
| A14: | 4.4962E−15 | 2.0601E−15 | 0.0000E+00 | 7.2046E−17 | 3.2820E−18 |
| A16: | −5.4338E−18 | −2.2155E−18 | 0.0000E+00 | −3.7869E−20 | −1.5342E−21 |
| A18: | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 |

TABLE 7

Embodiment 2

| f_G1 [mm] | 81.10 | CTG2 [mm] | 12.35 | G2R3 [mm] | −70.05 |
|---|---|---|---|---|---|
| f_G2 [mm] | 196.44 | MS1 [mm] | 18.85 | G2R4 [mm] | −98.35 |
| T12_N [mm] | 5.39 | MS2_F [mm] | 18.25 | TL [mm] | 24.10 |
| T12_F [mm] | 0.60 | G1R1 [mm] | 114.78 | IMH [mm] | 19.25 |
| CTG1 [mm] | 5.25 | G1R2 [mm] | −70.92 | f1 [mm] | 81.10 |
| f2 [mm] | 128.29 | f3 [mm] | −386.99 | — | — |

TABLE 8

Embodiment 2

| f_G1/f_G2 | 0.41 | f_G1/CTG1 | 15.45 |
|---|---|---|---|
| (CTG1 + CTG2)/T12_N | 3.26 | f_F/f_G1 | 0.30 |
| G2R4/G2R3 | 1.40 | f_G1/G1R1 | 0.71 |
| f_N*TL/(f_F*IMH) | 1.32 | f_G2/G2R3 | −2.80 |
| (FOV_F − FOV_N)/(T12_F − T12_N)[°/mm] | −2.09 | f_G2/G2R4 | −2.00 |
| (G2R3 + G2R4)/(G2R3 − G2R4) | −5.95 | MS2_F/f_G2 | 0.09 |
| CTG2/CTG1 | 2.35 | FOV_N/FOV_F | 0.90 |
| CTG1/G1R1 | 0.05 | (f_F/G1R1) + (f_F/G1R2) | −0.13 |
| CTG1/G1R2 | −0.07 | FOV_F/(T12_F*IMH) [°/mm$^2$] | 8.66 |
| MS1/CTG2 | 1.53 | TL/IMH | 1.25 |

Third Embodiment

Figure 3B:
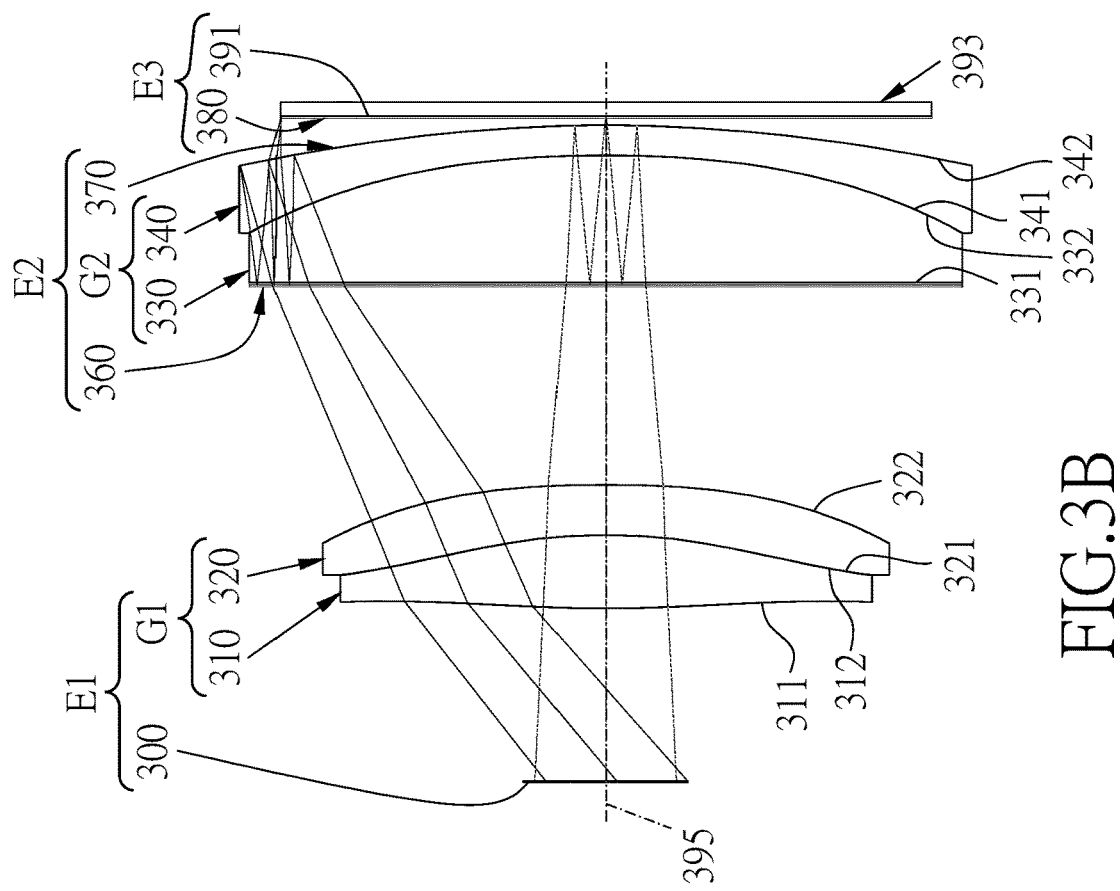
FIG. 3B is a schematic diagram of the optical lens assembly focusing on a near point in accordance with the third embodiment of the present invention.
Figure 3A:
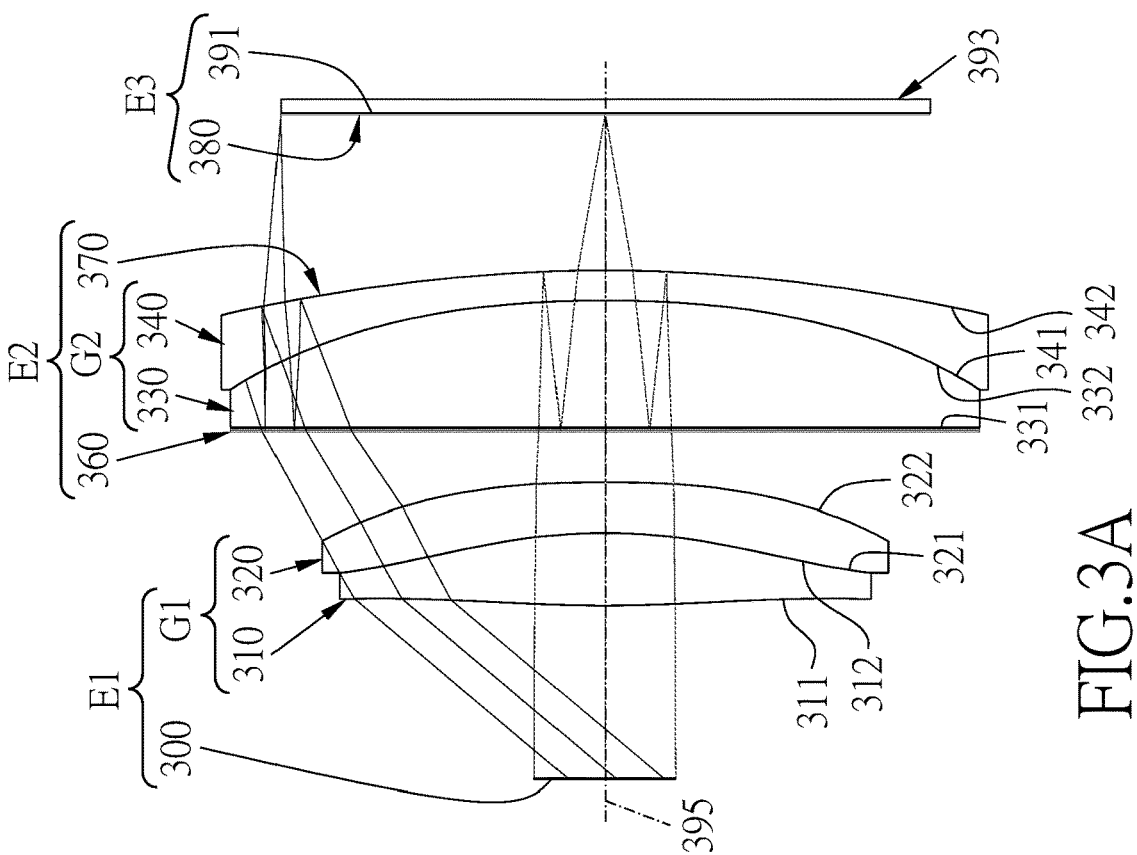
FIG. 3A is a schematic diagram of an optical lens assembly focusing on a far point in accordance with a third embodiment of the present invention.

Referring to FIGS. 3A and 3B, an optical lens assembly in accordance with a third embodiment of the present invention includes, in order from a visual side to an image source side along an optical axis 395: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of four lenses with refractive power, but is not limited thereto.

The first element group E1 includes, in order from the visual side to the image source side along the optical axis 395: a stop 300 and a first lens group G1.

The stop 300 may be located in a position where the user's eyes view an image.

The first lens group G1 with positive refractive power and includes, in order from the visual side to the image source side along the optical axis 395: a first lens 310 and a second lens 320.

The first lens 310 with positive refractive power includes a visual-side surface 311 and an image source-side surface 312, the visual-side surface 311 of the first lens 310 is convex in a paraxial region thereof, the image source-side surface 312 of the first lens 310 is convex in a paraxial region thereof, the visual-side surface 311 and the image source-side surface 312 of the first lens 310 are aspheric, and the first lens 310 is made of plastic.

The second lens 320 with negative refractive power includes a visual-side surface 321 and an image source-side surface 322, the visual-side surface 321 of the second lens 320 is concave in a paraxial region thereof, the image source-side surface 322 of the second lens 320 is convex in a paraxial region thereof, the visual-side surface 321 and the image source-side surface 322 of the second lens 320 are aspheric, and the second lens 320 is made of plastic.

The second lens 310 and the third lens 320 together form a cemented doublet lens.

The second element group E2 includes, in order from the visual side to the image source side along the optical axis 395: an optical element 360, a second lens group G2 and a partial-reflective-partial-transmissive element 370.

The second lens group G2 with positive refractive power includes, in order from the visual side to the image source side along the optical axis 395: a third lens 330 and a fourth lens 340.

The third lens 330 with positive refractive power includes a visual-side surface 331 and an image source-side surface 332, the visual-side surface 331 of the third lens 330 is flat in a paraxial region thereof, the image source-side surface 332 of the third lens 330 is convex in a paraxial region thereof, the image source-side surface 332 of the third lens 330 is aspheric, and the third lens 330 is made of plastic.

The fourth lens 340 with negative refractive power includes a visual-side surface 341 and an image source-side surface 342, the visual-side surface 341 of the fourth lens 340 is concave in a paraxial region thereof, the image source-side surface 342 of the fourth lens 340 is convex in a paraxial region thereof, the visual-side surface 341 and the image source-side surface 342 of the fourth lens 340 are aspheric, and the fourth lens 340 is made of plastic.

The third lens 330 and the fourth lens 340 together form a cemented doublet lens.

The first optical element 360 is located on the visual-side surface 331 of the third lens 330, and the configuration of the optical element 360 is the same as that of the optical element 160 of the first embodiment and will not be explained again.

The partial-reflective-partial-transmissive element 370 is located on the image source-side surface 342 of the fourth lens 340, and the configuration of the partial-reflective-partial-transmissive element 370 is the same as that of the partial-reflective-partial-transmissive element 170 of the first embodiment and will not be explained again.

The third element group E3 includes, in order from the visual side to the image source side along the optical axis 395: a second phase retarder 380 and an image source plane 391.

The configuration of the second phase retarder 380 is the same as that of the second phase retarder 180 of the first embodiment and will not be explained again.

The optical lens assembly works in cooperation with an image source 393 disposed on the image source plane 391. The image source plane 391 is located between the second phase retarder 380 and the image source 393. In the present embodiment, the type of the image source 393 is, for example, but not limited to, a liquid crystal display. However, in other embodiments, if the type of the image source 393 is an OLED display, a LED display, or other displays that can emit circularly-polarized light, the second phase retarder 380 may be omitted.

Please refer to Tables 9 to 12, Table 9 shows the detailed optical data of the elements of the optical lens assembly of the third embodiment, Table 10 shows the aspheric coefficients of the lenses of the third embodiment, Table 11 shows the remaining parameters of the optical lens assembly of the third embodiment and the values thereof, and the values of the parameters in Tables 9 and 11 satisfy the conditional formulas of Table 12. In Table 11, a focal length of the fourth lens 340 is f4. In the third embodiment, the equation of the aspheric surface profiles of the aforementioned lenses is the same as the equation of the aspheric surface profiles of the aforementioned lenses in the first embodiment. The definitions of the surfaces in Table 9 can be referred to the relevant description of Table 1 and will not be explained again.

TABLE 9

Embodiment 3
Near point: f_N = 30.44 mm, EPD(entrance pupil diameter) = 10.00 mm, FOV_N = 80.4°
Far point: f_F = 28.02 mm, EPD (entrance pupil diameter) = 10.00 mm, FOV_F = 101.1°

| Surface | | Curvature Radius | Thickness/gap | Refractive Index (nd) | Abbe number (vd) | Refraction/ reflection |
|---|---|---|---|---|---|---|
| 0 | Stop | Infinity | 12.000 | — | — | — |
| 1 | First lens | 96.503 | 5.000 | 1.545 | 57.0 | Refraction |
| 2 | Second lens | −45.015 | 3.493 | 1.657 | 20.9 | Refraction |
| 3 | | −110.500 | 13.662(Near point) 3.469 (Far point) | — | — | Refraction |
| 4 | Absorptive polarizer | Infinity | 0.100 | 1.533 | 56.0 | Refraction |
| 5 | Reflective polarizer | Infinity | 0.100 | 1.533 | 56.0 | Refraction |
| 6 | First phase retarder | Infinity | 0.100 | 1.533 | 56.0 | Refraction |
| 7 | Third lens | Infinity | 8.779 | 1.545 | 57.0 | Refraction |
| 8 | Fourth lens | −95.417 | 2.100 | 1.657 | 20.9 | Refraction |
| 9 | Partial-reflective-partial-transmissive element | −108.941 | −2.100 | 1.657 | 20.9 | Reflection |
| 10 | Third lens | −95.417 | −8.779 | 1.657 | 20.9 | Refraction |
| 11 | First phase retarder | Infinity | −0.100 | 1.533 | 56.0 | Refraction |
| 12 | Reflective polarizer | Infinity | −0.100 | 1.533 | 56.0 | Refraction |
| 13 | Reflective polarizer | Infinity | 0.100 | 1.533 | 56.0 | Reflection |
| 14 | First phase retarder | Infinity | 0.100 | 1.533 | 56.0 | Refraction |
| 15 | Third lens | Infinity | 8.779 | 1.657 | 20.9 | Refraction |
| 16 | Fourth lens | −95.417 | 2.100 | 1.545 | 57.0 | Refraction |
| 17 | | −108.941 | 0.500(Near point) 10.694(Far point) | — | — | Refraction |
| 18 | Second phase retarder | Infinity | 0.100 | 1.533 | 56.0 | Refraction |
| 19 | Image source plane | Infinity | — | — | — | — |

The reference wavelength is 555 nm

TABLE 10

Embodiment 3
Aspheric Coefficients

| Surface | 1 | 2 | 3 | 7, 11, 15 | 8, 10, 16 | 17 |
|---|---|---|---|---|---|---|
| K: | 0.0000E+00 | −4.6146E+00 | 0.0000E+00 | 0.0000E+00 | −1.4168E+01 | −1.8292E+01 |
| A2: | 0.0000E+00 | 0.0000E+00 | 0.0000E+00 | 0.0000E+00 | 0.0000E+00 | 0.0000E+00 |
| A4: | −3.0459E−05 | −4.1028E−05 | −3.5348E−05 | 0.0000E+00 | −1.1243E−05 | −6.1588E−07 |
| A6: | 2.1330E−07 | 5.2651E−07 | 1.8735E−07 | 0.0000E+00 | 1.5013E−08 | 6.9116E−10 |
| A8: | −1.4594E−09 | −2.4409E−09 | −8.7176E−10 | 0.0000E+00 | −1.3717E−11 | −3.4429E−12 |
| A10: | 6.7669E−12 | 5.2040E−12 | 2.5943E−12 | 0.0000E+00 | 3.2206E−15 | 1.0949E−14 |
| A12: | −1.8937E−14 | −4.1224E−15 | −4.7370E−15 | 0.0000E+00 | 0.0000E+00 | −2.0675E−17 |
| A14: | 2.8369E−17 | 0.0000E+00 | 4.8445E−18 | 0.0000E+00 | 0.0000E+00 | 1.9312E−20 |
| A16: | −1.7346E−20 | 0.0000E+00 | −2.0634E−21 | 0.0000E+00 | 0.0000E+00 | −7.0858E−24 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 11

Embodiment 3

| | | | | | |
|---|---|---|---|---|---|
| f_G1 [mm] | 111.79 | CTG2 [mm] | 10.88 | G2R3 [mm] | −95.42 |
| f_G2 [mm] | 204.86 | MS1 [mm] | 25.44 | G2R4 [mm] | −108.94 |
| T12_N [mm] | 13.96 | MS2_F [mm] | 21.67 | TL [mm] | 33.94 |
| T12_F [mm] | 3.77 | G1R1 [mm] | 96.50 | IMH [mm] | 22.92 |
| CTG1 [mm] | 8.49 | G1R2 [mm] | −110.50 | f1 [mm] | 56.74 |
| f2 [mm] | −116.11 | f3 [mm] | 174.18 | f4 [mm] | −1226.21 |

TABLE 12

Embodiment 3

| | | | |
|---|---|---|---|
| f_G1/f_G2 | 0.55 | f_G1/CTG1 | 13.16 |
| (CTG1 + CTG2)/T12_N | 1.39 | f_F/f_G1 | 0.25 |
| G2R4/G2R3 | 1.14 | f_G1/G1R1 | 1.16 |
| f_N*TL/(f_F*IMH) | 1.61 | f_G2/G2R3 | −2.15 |
| (FOV_F − FOV_N)/(T12_F − T12_N)[°/mm] | −2.03 | f_G2/G2R4 | −1.88 |
| (G2R3 + G2R4)/(G2R3 − G2R4) | −15.11 | MS2_F/f_G2 | 0.11 |
| CTG2/CTG1 | 1.28 | FOV_N/FOV_F | 0.80 |
| CTG1/G1R1 | 0.09 | (f_F/G1R1) + (f_F/G1R2) | 0.04 |
| CTG1/G1R2 | −0.08 | FOV_F/(T12_F*IMH) [°/mm$^2$] | 1.17 |
| MS1/CTG2 | 2.34 | TL/IMH | 1.48 |

Fourth Embodiment

Referring to FIGS. 4A and 4B, an optical lens assembly in accordance with a fourth embodiment of the present invention includes, in order from a visual side to an image source side along an optical axis 495: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of four lenses with refractive power, but is not limited thereto.

The first element group E1 includes, in order from the visual side to the image source side along the optical axis 495: a stop 400 and a first lens group G1.

The stop 400 may be located in a position where the user's eyes view an image.

The first lens group G1 with positive refractive power and includes, in order from the visual side to the image source side along the optical axis 495: a first lens 410 and a second lens 420.

The first lens 410 with positive refractive power includes a visual-side surface 411 and an image source-side surface 412, the visual-side surface 411 of the first lens 410 is convex in a paraxial region thereof, the image source-side surface 412 of the first lens 410 is convex in a paraxial region thereof, the visual-side surface 411 and the image source-side surface 412 of the first lens 410 are aspheric, and the first lens 410 is made of plastic.

The second lens 420 with negative refractive power includes a visual-side surface 421 and an image source-side surface 422, the visual-side surface 421 of the second lens 420 is concave in a paraxial region thereof, the image source-side surface 422 of the second lens 420 is convex in a paraxial region thereof, the visual-side surface 421 and the image source-side surface 422 of the second lens 420 are spherical, and the second lens 420 is made of plastic.

The second element group E2 includes, in order from the visual side to the image source side along the optical axis 495: an optical element 460, a second lens group G2 and a partial-reflective-partial-transmissive element 470.

The second lens group G2 with positive refractive power includes, in order from the visual side to the image source side along the optical axis 495: a third lens 430 and a fourth lens 440.

The third lens 430 with positive refractive power includes a visual-side surface 431 and an image source-side surface 432, the visual-side surface 431 of the third lens 430 is flat in a paraxial region thereof, the image source-side surface 432 of the third lens 430 is convex in a paraxial region thereof, the image source-side surface 432 of the third lens 430 is aspheric, and the third lens 430 is made of plastic.

The fourth lens 440 with positive refractive power includes a visual-side surface 441 and an image source-side surface 442, the visual-side surface 441 of the fourth lens 440 is concave in a paraxial region thereof, the image source-side surface 442 of the fourth lens 440 is convex in a paraxial region thereof, the visual-side surface 441 and the image source-side surface 442 of the fourth lens 440 are aspheric, and the fourth lens 440 is made of plastic.

The third lens 430 and the fourth lens 440 together form a cemented doublet lens.

The first optical element 460 is located on the visual-side surface 431 of the third lens 430, and the configuration of the optical element 460 is the same as that of the optical element 160 of the first embodiment and will not be explained again.

The partial-reflective-partial-transmissive element 470 is located on the image source-side surface 442 of the fourth lens 440, and the configuration of the partial-reflective-partial-transmissive element 470 is the same as that of the partial-reflective-partial-transmissive element 170 of the first embodiment and will not be explained again.

The third element group E3 includes, in order from the visual side to the image source side along the optical axis 495: a second phase retarder 480 and an image source plane 491.

The configuration of the second phase retarder 480 is the same as that of the second phase retarder 180 of the first embodiment and will not be explained again.

The optical lens assembly works in cooperation with an image source 493 disposed on the image source plane 491. The image source plane 491 is located between the second phase retarder 480 and the image source 493. In the present embodiment, the type of the image source 493 is, for example, but not limited to, a liquid crystal display. However, in other embodiments, if the type of the image source 493 is an OLED display, a LED display, or other displays that can emit circularly-polarized light, the second phase retarder 480 may be omitted.

Please refer to Tables 13 to 16, Table 13 shows the detailed optical data of the elements of the optical lens assembly of the fourth embodiment, Table 14 shows the aspheric coefficients of the lenses of the fourth embodiment, Table 15 shows the remaining parameters of the optical lens assembly of the fourth embodiment and the values thereof, and the values of the parameters in Tables 13 and 15 satisfy the conditional formulas of Table 16. In Table 15, a focal length of the fourth lens 440 is f4. In the fourth embodiment, the equation of the aspheric surface profiles of the aforementioned lenses is the same as the equation of the aspheric surface profiles of the aforementioned lenses in the first embodiment. The definitions of the surfaces in Table 13 can be referred to the relevant description of Table 1 and will not be explained again.

TABLE 13

Embodiment 4
Near point: f_N = 23.37 mm, EPD(entrance pupil diameter) = 10.00 mm, FOV_N = 93.5°
Far point: f_F = 22.86 mm, EPD (entrance pupil diameter) = 10.00 mm, FOV_F = 106.0°

| Surface | | Curvature Radius | Thickness/gap | Refractive Index (nd) | Abbe number (vd) | Refraction/reflection |
|---|---|---|---|---|---|---|
| 0 | Stop | Infinity | 12.000 | — | — | — |
| 1 | First lens | 58.643 | 10.000 | 1.544 | 55.9 | Refraction |
| 2 | | −29.220 | 0.300 | — | — | Refraction |
| 3 | Second lens | −22.755 | 2.000 | 1.657 | 20.9 | Refraction |
| 4 | | −95.810 | 4.146(Near point) 0.500(Far point) | — | — | Refraction |
| 5 | Absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 2.200 | 1.657 | 20.9 | Refraction |
| 9 | Fourth lens | −199.744 | 7.943 | 1.544 | 55.9 | Refraction |
| 10 | Partial-reflective-partial-transmissive element | −80.509 | −7.943 | 1.544 | 55.9 | Reflection |
| 11 | Third lens | −199.744 | −2.200 | 1.657 | 20.9 | Refraction |
| 12 | First phase retarder | Infinity | −0.100 | 1.533 | 56.0 | Refraction |
| 13 | Reflective polarize | Infinity | −0.100 | 1.533 | 56.0 | Refraction |
| 14 | Reflective polarize | Infinity | 0.100 | 1.533 | 56.0 | Reflection |
| 15 | First phase retarder | Infinity | 0.100 | 1.533 | 56.0 | Refraction |
| 16 | Third lens | Infinity | 2.200 | 1.657 | 20.9 | Refraction |
| 17 | Fourth lens | −199.744 | 7.943 | 1.544 | 55.9 | Refraction |
| 18 | | −80.509 | 3.831(Near point) 7.477(Far point) | — | — | Refraction |
| 19 | Second phase retarder | Infinity | 0.100 | 1.533 | 56.0 | Refraction |
| 20 | Image source plane | Infinity | — | — | — | — |

The reference wavelength is 555 nm.

TABLE 14

Embodiment 4
Aspheric Coefficients

| Surface | 1 | 2 | 3 | 4 |
|---|---|---|---|---|
| K: | −3.9003E+01 | 2.2815E−01 | 0.0000E+00 | 0.0000E+00 |
| A2: | 0.0000E+00 | 0.0000E+00 | 0.0000E+00 | 0.0000E+00 |
| A4: | −4.5753E−06 | −1.1909E−05 | 3.2665E−05 | −1.3739E−06 |
| A6: | 6.3327E−09 | 5.0548E−08 | −1.4709E−09 | 1.3075E−08 |
| A8: | −2.7924E−11 | −1.1527E−10 | 1.0219E−11 | −9.5546E−13 |
| A10: | −8.5008E−14 | 1.2912E−14 | 2.2909E−14 | −9.9601E−15 |
| A12: | −2.6158E−16 | 3.2351E−16 | 4.8941E−17 | −2.1086E−17 |
| A14: | −5.8357E−19 | −1.6431E−19 | 6.5312E−20 | −1.4080E−20 |
| A16: | 2.5334E−21 | −3.6462E−21 | −5.4035E−23 | 3.4736E−23 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 12, 16 | 9, 11, 17 | 18 | — |
|---|---|---|---|---|
| K: | 0.0000E+00 | 0.0000E+00 | −1.4538E+01 | — |
| A2: | 0.0000E+00 | 0.0000E+00 | 0.0000E+00 | — |
| A4: | 0.0000E+00 | 1.0194E−05 | 1.1025E−07 | — |
| A6: | 0.0000E+00 | −1.0112E−08 | −1.4534E−09 | — |
| A8: | 0.0000E+00 | 1.0254E−12 | −2.2956E−13 | — |
| A10: | 0.0000E+00 | 4.1720E−15 | 5.2677E−16 | — |
| A12: | 0.0000E+00 | −1.0619E−18 | 4.1338E−19 | — |
| A14: | 0.0000E+00 | −6.7911E−21 | −1.2806E−22 | — |
| A16: | 0.0000E+00 | 7.9595E−24 | −3.5248E−25 | — |
| A18: | 0.0000E+00 | 0.0000E+00 | 0.0000E+00 | — |
| A20: | 0.0000E+00 | 0.0000E+00 | 0.0000E+00 | — |

TABLE 15

Embodiment 4

| f_G1 [mm] | 163.18 | CTG2 [mm] | 10.14 | G2R3 [mm] | −199.74 |
|---|---|---|---|---|---|
| f_G2 [mm] | 135.98 | MS1 [mm] | 18.52 | G2R4 [mm] | −80.51 |
| T12_N [mm] | 4.45 | MS2_F [mm] | 17.72 | TL [mm] | 30.82 |
| T12_F [mm] | 0.80 | G1R1 [mm] | 58.64 | IMH [mm] | 19.25 |
| CTG1 [mm] | 12.30 | G1R2 [mm] | −95.81 | f1 [mm] | 37.22 |
| f2 [mm] | −45.41 | f3 [mm] | 300.62 | f4 [mm] | 241.35 |

TABLE 16

Embodiment 4

| f_G1/f_G2 | 1.20 | f_G1/CTG1 | 13.27 |
|---|---|---|---|
| (CTG1 + CTG2)/T12_N | 5.05 | f_F/f_G1 | 0.14 |
| G2R4/G2R3 | 0.40 | f_G1/G1R1 | 2.78 |
| f_N*TL/(f_F*IMH) | 1.64 | f_G2/G2R3 | −0.68 |
| (FOV_F − FOV_N)/(T12_F − T12_N)[°/mm] | −3.43 | f_G2/G2R4 | −1.69 |
| (G2R3 + G2R4)/(G2R3 − G2R4) | 2.35 | MS2_F/f_G2 | 0.13 |
| CTG2/CTG1 | 0.82 | FOV_N/FOV_F | 0.88 |
| CTG1/G1R1 | 0.21 | (f_F/G1R1) + (f_F/G1R2) | 0.15 |
| CTG1/G1R2 | −0.13 | FOV_F/(T12_F*IMH) [°/mm$^2$] | 6.88 |
| MS1/CTG2 | 1.83 | TL/IMH | 1.60 |

Fifth Embodiment

Figure 5B:
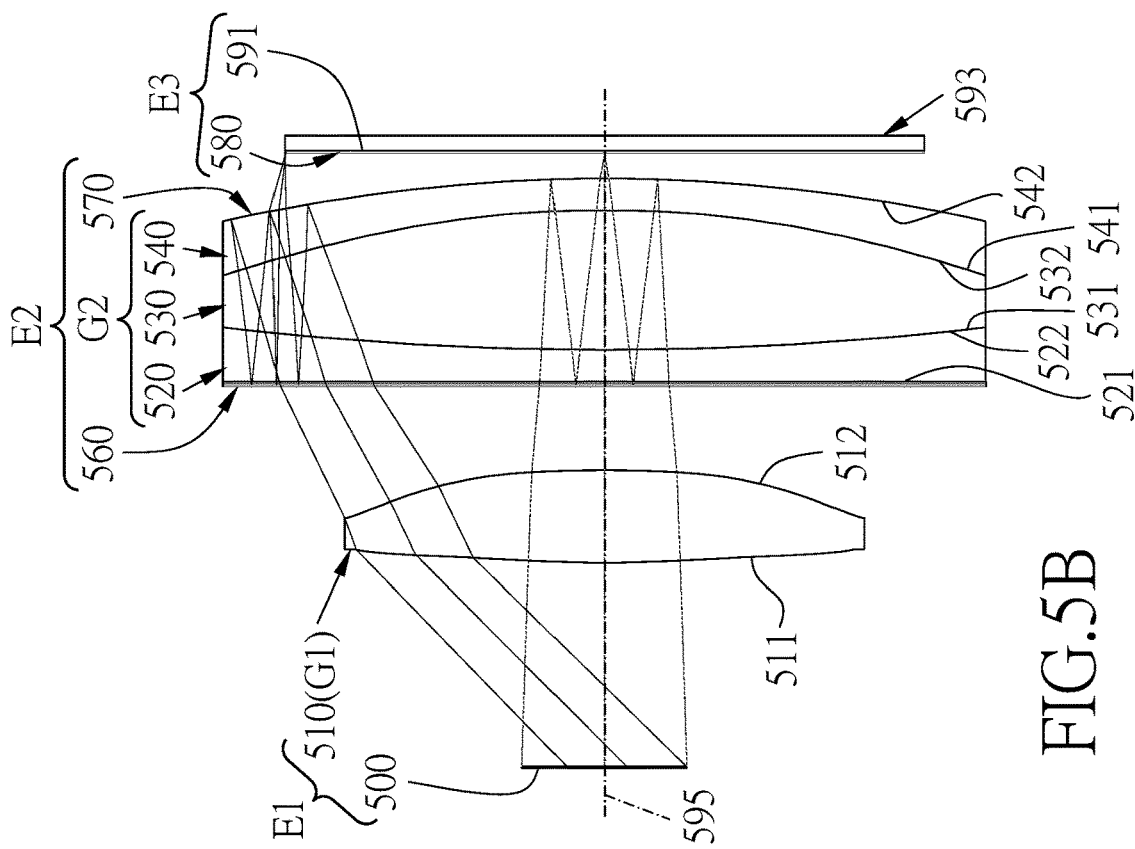
FIG. 5B is a schematic diagram of the optical lens assembly focusing on a near point in accordance with the fifth embodiment of the present invention.
Figure 5A:
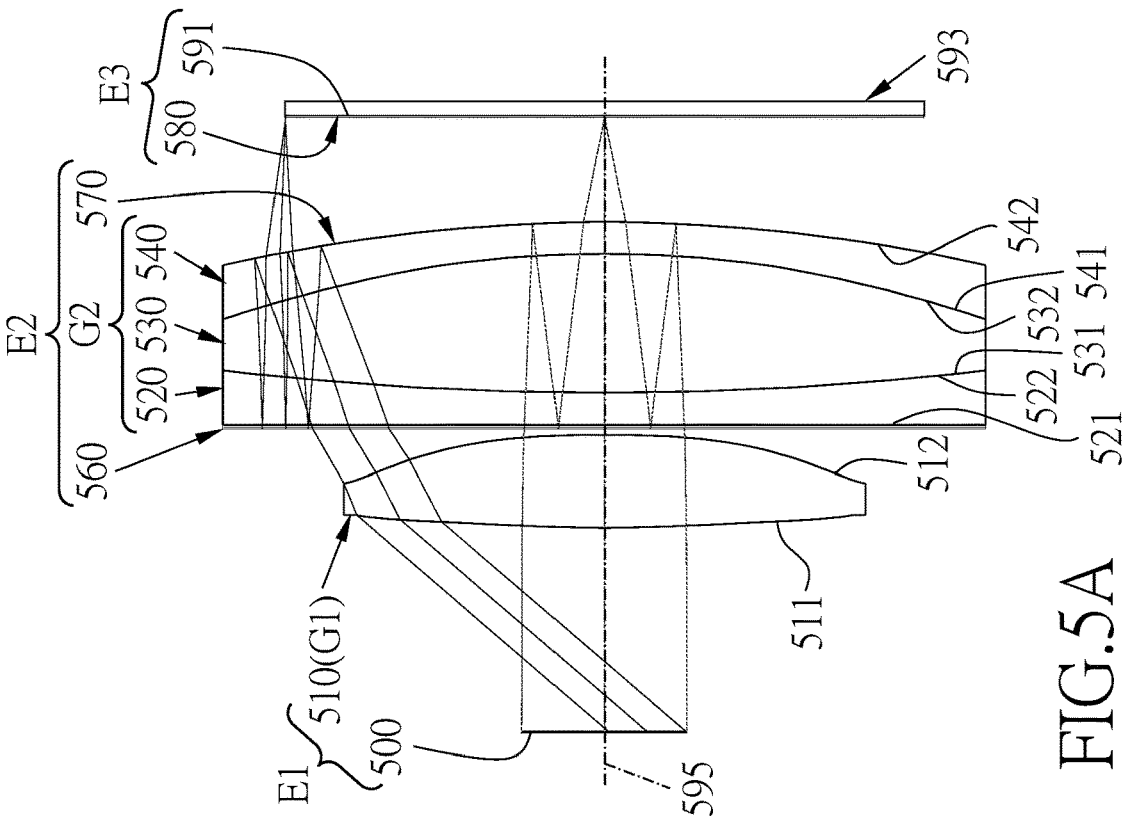
FIG. 5A is a schematic diagram of an optical lens assembly focusing on a far point in accordance with a fifth embodiment of the present invention.

Referring to FIGS. 5A and 5B, an optical lens assembly in accordance with a fifth embodiment of the present invention includes, in order from a visual side to an image source side along an optical axis 595: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of four lenses with refractive power, but is not limited thereto.

The first element group E1 includes, in order from the visual side to the image source side along the optical axis 595: a stop 500 and a first lens group G1.

The stop 500 may be located in a position where the user's eyes view an image.

The first lens group G1 with positive refractive power and includes only a first lens 510. The first lens 510 with positive refractive power includes a visual-side surface 511 and an image source-side surface 512, the visual-side surface 511 of the first lens 510 is convex in a paraxial region thereof, the image source-side surface 512 of the first lens 510 is convex in a paraxial region thereof, the visual-side surface 511 and the image source-side surface 512 of the first lens 510 are aspheric, and the first lens 510 is made of plastic.

The second element group E2 includes, in order from the visual side to the image source side along the optical axis 595: an optical element 560, a second lens group G2 and a partial-reflective-partial-transmissive element 570.

The second lens group G2 with positive refractive power includes, in order from the visual side to the image source side along the optical axis 595: a second lens 520, a third lens 530 and a fourth lens 540.

The second lens 520 with negative refractive power includes a visual-side surface 521 and an image source-side surface 522, the visual-side surface 521 of the second lens 520 is flat in a paraxial region thereof, the image source-side surface 522 of the second lens 520 is concave in a paraxial region thereof, the image source-side surface 522 of the second lens 520 is spherical, and the second lens 520 is made of plastic.

The third lens 530 with positive refractive power includes a visual-side surface 531 and an image source-side surface 532, the visual-side surface 531 of the third lens 530 is convex in a paraxial region thereof, the image source-side surface 532 of the third lens 530 is convex in a paraxial region thereof, the visual-side surface 531 of the third lens 530 is spherical, the image source-side surface 532 of the third lens 530 is aspheric, and the third lens 530 is made of plastic.

The fourth lens 540 with negative refractive power includes a visual-side surface 541 and an image source-side surface 542, the visual-side surface 541 of the fourth lens 540 is concave in a paraxial region thereof, the image source-side surface 542 of the fourth lens 540 is convex in a paraxial region thereof, the visual-side surface 541 and the image source-side surface 542 of the fourth lens 540 are aspheric, and the fourth lens 540 is made of plastic.

The second lens 520, the third lens 530 and the fourth lens 540 together form a cemented doublet lens.

The first optical element 560 is located on the visual-side surface 521 of the second lens 520, and the configuration of the optical element 560 is the same as that of the optical element 160 of the first embodiment and will not be explained again.

The partial-reflective-partial-transmissive element 570 is located on the image source-side surface 542 of the fourth lens 540, and the configuration of the partial-reflective-partial-transmissive element 570 is the same as that of the partial-reflective-partial-transmissive element 170 of the first embodiment and will not be explained again.

The third element group E3 includes, in order from the visual side to the image source side along the optical axis 595: a second phase retarder 580 and an image source plane 591.

The configuration of the second phase retarder 580 is the same as that of the second phase retarder 180 of the first embodiment and will not be explained again.

The optical lens assembly works in cooperation with an image source 593 disposed on the image source plane 591. The image source plane 591 is located between the second phase retarder 580 and the image source 593. In the present embodiment, the type of the image source 593 is, for example, but not limited to, a liquid crystal display. However, in other embodiments, if the type of the image source 593 is an OLED display, a LED display, or other displays that can emit circularly-polarized light, the second phase retarder 580 may be omitted.

Please refer to Tables 17 to 20, Table 17 shows the detailed optical data of the elements of the optical lens assembly of the fifth embodiment, Table 18 shows the aspheric coefficients of the lenses of the fifth embodiment, Table 19 shows the remaining parameters of the optical lens assembly of the fifth embodiment and the values thereof, and the values of the parameters in Tables 17 and 19 satisfy the conditional formulas of Table 20. In Table 19, a focal length of the fourth lens 540 is f4. In the fifth embodiment, the equation of the aspheric surface profiles of the aforementioned lenses is the same as the equation of the aspheric surface profiles of the aforementioned lenses in the first embodiment. The definitions of the surfaces in Table 17 can be referred to the relevant description of Table 1 and will not be explained again.

TABLE 17

Embodiment 5
Near point: f_N = 25.68 mm, EPD(entrance pupil diameter) = 10.00 mm, FOV_N = 90.8°
Far point: f_F = 24.47 mm, EPD (entrance pupil diameter) = 10.00 mm, FOV_F = 100.0°

| Surface | | Curvature Radius | Thickness/gap | Refractive Index (nd) | Abbe number (vd) | Refraction/reflection |
|---|---|---|---|---|---|---|
| 0 | Stop | Infinity | 12.000 | — | — | — |
| 1 | First lens | 72.364 | 5.435 | 1.545 | 57.0 | Refraction |
| 2 | | −109.387 | 4.894(Near point) 0.313(Far point) | — | — | Refraction |
| 3 | Absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 1.870 | 1.657 | 20.9 | Refraction |
| 7 | Third lens | 200.000 | 8.171 | 1.545 | 57.0 | Refraction |
| 8 | Fourth lens | −86.218 | 1.880 | 1.657 | 20.9 | Refraction |
| 9 | Partial-reflective-partial-transmissive element | −95.645 | −1.880 | 1.657 | 20.9 | Reflection |
| 10 | Third lens | −86.218 | −8.171 | 1.545 | 57.0 | Refraction |
| 11 | Second lens | 200.000 | −1.870 | 1.657 | 20.9 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | Reflective polarizer | Infinity | 0.100 | 1.533 | 56.0 | Reflection |
| 15 | First phase retarder | Infinity | 0.100 | 1.533 | 56.0 | Refraction |

TABLE 17-continued

Embodiment 5
Near point: f_N = 25.68 mm, EPD(entrance pupil diameter) = 10.00 mm, FOV_N = 90.8°
Far point: f_F = 24.47 mm, EPD (entrance pupil diameter) = 10.00 mm, FOV_F = 100.0°

| Surface | | Curvature Radius | Thickness/gap | Refractive Index (nd) | Abbe number (vd) | Refraction/reflection |
|---|---|---|---|---|---|---|
| 16 | Second lens | Infinity | 1.870 | 1.657 | 20.9 | Refraction |
| 17 | Third lens | 200.000 | 8.171 | 1.545 | 57.0 | Refraction |
| 18 | Fourth lens | −86.218 | 1.880 | 1.657 | 20.9 | Refraction |
| 19 | | −95.645 | 1.470(Near point) 6.050(Far point) | — | — | Refraction |
| 20 | Second phase retarder | Infinity | 0.100 | 1.533 | 56.0 | Refraction |
| 21 | Image source plane | Infinity | — | — | — | — |

The reference wavelength is 555 nm.

TABLE 18

Embodiment 5
Aspheric Coefficients

| Surface | 1 | 2 | 6, 12, 16 | 7, 11, 17 | 8, 10, 18 | 9, 19 |
|---|---|---|---|---|---|---|
| K: | 0.0000E+00 | 0.0000E+00 | 0.0000E+00 | 0.0000E+00 | 0.0000E+00 | −2.8052E+01 |
| A2: | 0.0000E+00 | 0.0000E+00 | 0.0000E+00 | 0.0000E+00 | 0.0000E+00 | 0.0000E+00 |
| A4: | −7.5329E−05 | −8.0259E−05 | 0.0000E+00 | 0.0000E+00 | −1.8143E−05 | −1.6694E−06 |
| A6: | 1.0051E−06 | 5.4774E−07 | 0.0000E+00 | 0.0000E+00 | 8.0901E−08 | 3.5104E−09 |
| A8: | −1.0763E−08 | −3.1739E−09 | 0.0000E+00 | 0.0000E+00 | −1.5464E−10 | −1.3450E−11 |
| A10: | 7.5462E−11 | 8.1268E−12 | 0.0000E+00 | 0.0000E+00 | 1.0871E−13 | 4.1790E−14 |
| A12: | −3.1805E−13 | 1.9052E−14 | 0.0000E+00 | 0.0000E+00 | 0.0000E+00 | −1.1662E−16 |
| A14: | 7.3497E−16 | −1.6220E−16 | 0.0000E+00 | 0.0000E+00 | 0.0000E+00 | 1.7532E−19 |
| A16: | −6.9463E−19 | 2.9328E−19 | 0.0000E+00 | 0.0000E+00 | 0.0000E+00 | −1.0049E−22 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 19

Embodiment 5

| f_G1 [mm] | 80.35 | CTG2 [mm] | 11.92 | G2R3 [mm] | −86.22 |
|---|---|---|---|---|---|
| f_G2 [mm] | 199.20 | MS1 [mm] | 18.69 | G2R4 [mm] | −95.64 |
| T12_N [mm] | 5.19 | MS2_F [mm] | 18.07 | TL [mm] | 24.12 |
| T12_F [mm] | 0.61 | G1R1 [mm] | 72.36 | IMH [mm] | 19.25 |
| CTG1 [mm] | 5.43 | G1R2 [mm] | −109.39 | f1 [mm] | 80.35 |
| f2 [mm] | −299.20 | f3 [mm] | 111.10 | f4 [mm] | −1422.24 |

TABLE 20

Embodiment 5

| f_G1/f_G2 | 0.40 | f_G1/CTG1 | 14.78 |
|---|---|---|---|
| (CTG1 + CTG2)/T12_N | 3.34 | f_F/f_G1 | 0.30 |
| G2R4/G2R3 | 1.11 | f_G1/G1R1 | 1.11 |
| f_N*TL/(f_F*IMH) | 1.31 | f_G2/G2R3 | −2.31 |
| (FOV_F − FOV_N)/(T12_F − T12_N)[°/mm] | −2.01 | f_G2/G2R4 | −2.08 |
| (G2R3 + G2R4)/(G2R3 − G2R4) | −19.29 | MS2_F/f_G2 | 0.09 |
| CTG2/CTG1 | 2.19 | FOV_N/FOV_F | 0.91 |
| CTG1/G1R1 | 0.08 | (f_F/G1R1) + (f_F/G1R2) | 0.11 |
| CTG1/G1R2 | −0.05 | FOV_F/(T12_F*IMH) [°/mm²] | 8.47 |
| MS1/CTG2 | 1.57 | TL/IMH | 1.25 |

Sixth Embodiment

Figure 6B:
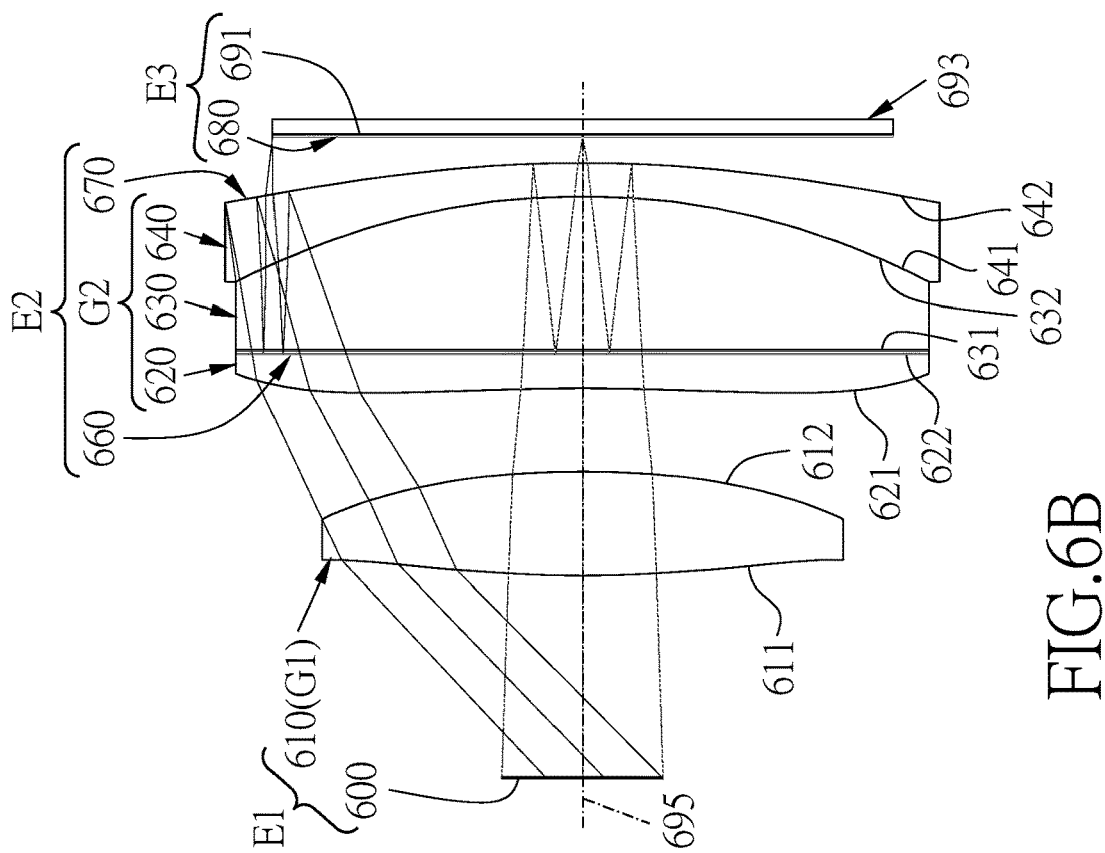
FIG. 6B is a schematic diagram of the optical lens assembly focusing on a near point in accordance with the sixth embodiment of the present invention.
Figure 6A:
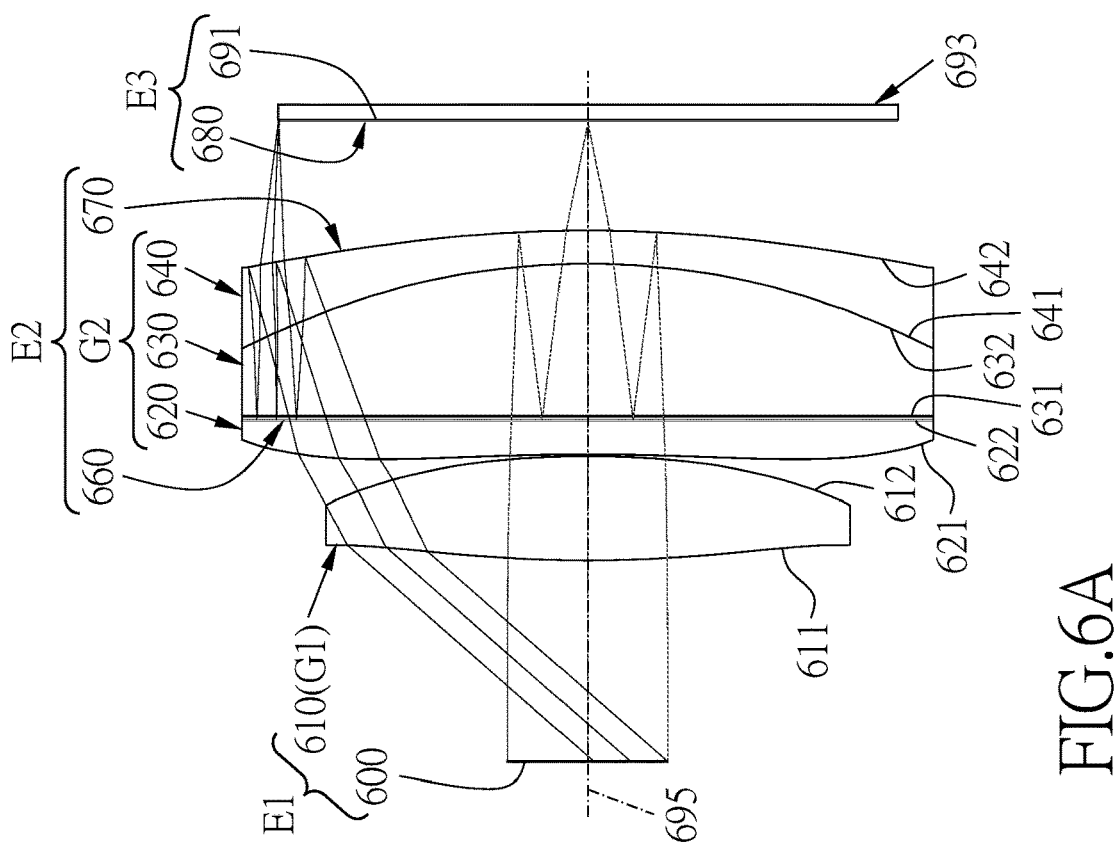
FIG. 6A is a schematic diagram of an optical lens assembly focusing on a far point in accordance with a sixth embodiment of the present invention.

Referring to FIGS. 6A and 6B, an optical lens assembly in accordance with a sixth embodiment of the present invention includes, in order from a visual side to an image source side along an optical axis 695: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of four lenses with refractive power, but is not limited thereto.

The first element group E1 includes, in order from the visual side to the image source side along the optical axis 695: a stop 600 and a first lens group G1.

The stop 600 may be located in a position where the user's eyes view an image.

The first lens group G1 with positive refractive power and includes only a first lens 610. The first lens 610 with positive refractive power includes a visual-side surface 611 and an image source-side surface 612, the visual-side surface 611 of the first lens 610 is convex in a paraxial region thereof, the image source-side surface 612 of the first lens 610 is convex in a paraxial region thereof, the visual-side surface 611 and the image source-side surface 612 of the first lens 610 are aspheric, and the first lens 610 is made of plastic.

The second element group E2 includes an optical element 660, a second lens group G2 and a partial-reflective-partial-transmissive element 670.

The second lens group G2 with positive refractive power includes, in order from the visual side to the image source side along the optical axis 695: a second lens 620, a third lens 630 and a fourth lens 640.

The second lens 620 with negative refractive power includes a visual-side surface 621 and an image source-side surface 622, the visual-side surface 621 of the second lens 620 is concave in a paraxial region thereof, the image source-side surface 622 of the second lens 620 is flat in a paraxial region thereof, the visual-side surface 621 of the second lens 620 is aspheric, and the second lens 620 is made of plastic.

The third lens 630 with positive refractive power includes a visual-side surface 631 and an image source-side surface 632, the visual-side surface 631 of the third lens 630 is flat in a paraxial region thereof, the image source-side surface 632 of the third lens 630 is convex in a paraxial region thereof, the image source-side surface 632 of the third lens 630 is aspheric, and the third lens 630 is made of plastic.

The fourth lens 640 with negative refractive power includes a visual-side surface 641 and an image source-side surface 642, the visual-side surface 641 of the fourth lens 640 is concave in a paraxial region thereof, the image source-side surface 642 of the fourth lens 640 is convex in a paraxial region thereof, the visual-side surface 641 and the image source-side surface 642 of the fourth lens 640 are aspheric, and the fourth lens 640 is made of plastic.

The third lens 630 and the fourth lens 640 together form a cemented doublet lens.

The optical element 660 is located between the second lens 620 and the third lens 630, and the opposite two sides of the optical element 660 are attached to the image source-side surface 622 of the second lens 620 and the e visual-side surface 631 of the third lens 630, respectively. The configuration of the optical element 660 is the same as that of the optical element 160 of the first embodiment and will not be explained again.

The partial-reflective-partial-transmissive element 670 is located on the image source-side surface 642 of the fourth lens 640, and the configuration of the partial-reflective-partial-transmissive element 670 is the same as that of the partial-reflective-partial-transmissive element 170 of the first embodiment and will not be explained again.

The third element group E3 includes, in order from the visual side to the image source side along the optical axis 695: a second phase retarder 680 and an image source plane 691.

The configuration of the second phase retarder 680 is the same as that of the second phase retarder 180 of the first embodiment and will not be explained again.

The optical lens assembly works in cooperation with an image source 693 disposed on the image source plane 691. The image source plane 691 is located between the second phase retarder 680 and the image source 693. In the present embodiment, the type of the image source 693 is, for example, but not limited to, a liquid crystal display. However, in other embodiments, if the type of the image source 693 is an OLED display, a LED display, or other displays that can emit circularly-polarized light, the second phase retarder 680 may be omitted.

Please refer to Tables 21 to 24, Table 21 shows the detailed optical data of the elements of the optical lens assembly of the sixth embodiment, Table 22 shows the aspheric coefficients of the lenses of the sixth embodiment, Table 23 shows the remaining parameters of the optical lens assembly of the sixth embodiment and the values thereof, and the values of the parameters in Tables 21 and 23 satisfy the conditional formulas of Table 24. In Table 23, a focal length of the fourth lens 640 is f4. In the sixth embodiment, the equation of the aspheric surface profiles of the aforementioned lenses is the same as the equation of the aspheric surface profiles of the aforementioned lenses in the first embodiment. The definitions of the surfaces in Table 21 can be referred to the relevant description of Table 1 and will not be explained again.

TABLE 21

Embodiment 6
Near point: f_N = 25.43 mm, EPD(entrance pupil diameter) = 10.00 mm, FOV_N = 89.9°
Far point: f_F = 23.93 mm, EPD (entrance pupil diameter) = 10.00 mm, FOV_F = 99.9°

| Surface | | Curvature Radius | Thickness/gap | Refractive Index (nd) | Abbe number (vd) | Refraction/reflection |
|---|---|---|---|---|---|---|
| 0 | Stop | Infinity | 12.000 | — | — | — |
| 1 | First lens | 72.876 | 6.165 | 1.547 | 53.0 | Refraction |
| 2 | | −69.987 | 4.953(Near point) 0.100(Far point) | — | — | Refraction |
| 3 | Second lens | −154.010 | 2.000 | 1.547 | 53.0 | Refraction |
| 4 | | Infinity | 0.000 | — | — | Refraction |
| 5 | Absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |

TABLE 21-continued

Embodiment 6
Near point: f_N = 25.43 mm, EPD(entrance pupil diameter) = 10.00 mm, FOV_N = 89.9°
Far point: f_F = 23.93 mm, EPD (entrance pupil diameter) = 10.00 mm, FOV_F = 99.9°

| Surface | | Curvature Radius | Thickness/gap | Refractive Index (nd) | Abbe number (vd) | Refraction/ reflection |
|---|---|---|---|---|---|---|
| 8 | Third lens | Infinity | 9.072 | 1.547 | 53.0 | Refraction |
| 9 | Fourth lens | −52.940 | 2.000 | 1.657 | 20.9 | Refraction |
| 10 | Partial-reflective-partial-transmissive element | −89.538 | −2.000 | 1.657 | 20.9 | Reflection |
| 11 | Third lens | −52.940 | −9.072 | 1.547 | 53.0 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | Reflective polarizer | Infinity | 0.100 | 1.533 | 56.0 | Reflection |
| 15 | First phase retarder | Infinity | 0.100 | 1.533 | 56.0 | Refraction |
| 16 | Third lens | Infinity | 9.072 | 1.547 | 53.0 | Refraction |
| 17 | Fourth lens | −52.940 | 2.000 | 1.657 | 20.9 | Refraction |
| 18 | | −89.538 | 1.570(Near point) 6.427(Far point) | — | — | Refraction |
| 19 | Second phase retarder | Infinity | 0.100 | 1.533 | 56.0 | Refraction |
| 20 | Image source plane | Infinity | — | — | — | — |

The reference wavelength is 555 nm

TABLE 22

Embodiment 6
Aspheric Coefficients

| Surface | 1 | 2 | 3 | 4 |
|---|---|---|---|---|
| K: | 7.5346E+00 | −9.6963E+01 | 0.0000E+00 | 0.0000E+00 |
| A2: | 0.0000E+00 | 0.0000E+00 | 0.0000E+00 | 0.0000E+00 |
| A4: | −3.2939E−05 | −6.1282E−05 | 8.7990E−06 | 0.0000E+00 |
| A6: | 2.3282E−07 | 3.6160E−07 | 3.4683E−09 | 0.0000E+00 |
| A8: | −1.2413E−09 | −2.0622E−09 | −9.5474E−12 | 0.0000E+00 |
| A10: | 3.2616E−12 | 1.0896E−11 | 5.4415E−14 | 0.0000E+00 |
| A12: | −2.2586E−15 | −4.4438E−14 | −5.7759E−17 | 0.0000E+00 |
| A14: | −7.0843E−18 | 1.1038E−16 | 1.5366E−21 | 0.0000E+00 |
| A16: | 0.0000E+00 | −1.2542E−19 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 22-continued

Embodiment 6
Aspheric Coefficients

| Surface | 8, 12, 16 | 9, 11, 17 | 10, 18 | |
|---|---|---|---|---|
| K: | 0.0000E+00 | 3.3643E+00 | −5.0335E−01 | — |
| A2: | 0.0000E+00 | 0.0000E+00 | 0.0000E+00 | — |
| A4: | 0.0000E+00 | −1.7357E−05 | 6.5383E−07 | — |
| A6: | 0.0000E+00 | 2.3658E−07 | 1.4623E−08 | — |
| A8: | 0.0000E+00 | −1.6878E−09 | −1.0830E−10 | — |
| A10: | 0.0000E+00 | 7.2220E−12 | 4.3178E−13 | — |
| A12: | 0.0000E+00 | −1.7501E−14 | −9.7064E−16 | — |
| A14: | 0.0000E+00 | 2.2087E−17 | 1.1507E−18 | — |
| A16: | 0.0000E+00 | −1.1147E−20 | −5.4752E−22 | — |
| A18: | 0.0000E+00 | 0.0000E+00 | 0.0000E+00 | — |
| A20: | 0.0000E+00 | 0.0000E+00 | 0.0000E+00 | — |

TABLE 23

Embodiment 6

| | | | | | |
|---|---|---|---|---|---|
| f_G1 [mm] | 66.02 | CTG2 [mm] | 13.37 | G2R3 [mm] | −52.94 |
| f_G2 [mm] | 535.31 | MS1 [mm] | 19.99 | G2R4 [mm] | −89.54 |
| T12_N [mm] | 4.95 | MS2_F [mm] | 19.90 | TL [mm] | 26.16 |
| T12_F [mm] | 0.10 | G1R1 [mm] | 72.88 | IMH [mm] | 19.25 |
| CTG1 [mm] | 6.17 | G1R2 [mm] | −69.99 | f1 [mm] | 66.02 |
| f2 [mm] | −280.45 | f3 [mm] | 96.40 | f4 [mm] | −199.34 |

TABLE 24

Embodiment 6

| | | | |
|---|---|---|---|
| f_G1/f_G2 | 0.12 | f_G1/CTG1 | 10.71 |
| (CTG1 + CTG2)/T12_N | 3.94 | f_F/f_G1 | 0.36 |
| G2R4/G2R3 | 1.69 | f_G1/G1R1 | 0.91 |
| f_N*TL/(f_F*IMH) | 1.44 | f_G2/G2R3 | −10.11 |
| (FOV_F − FOV_N)/(T12_F − T12_N)[°/mm] | −2.06 | f_G2/G2R4 | −5.98 |
| (G2R3 + G2R4)/(G2R3 − G2R4) | −3.89 | MS2_F/f_G2 | 0.04 |
| CTG2/CTG1 | 2.17 | FOV_N/FOV_F | 0.90 |
| CTG1/G1R1 | 0.08 | (f_F/G1R1) + (f_F/G1R2) | −0.01 |
| CTG1/G1R2 | −0.09 | FOV_F/(T12_F*IMH) [°/mm$^2$] | 51.90 |
| MS1/CTG2 | 1.50 | TL/IMH | 1.36 |

Seventh Embodiment

Referring to FIGS. 7A and 7B, an optical lens assembly in accordance with a seventh embodiment of the present invention includes, in order from a visual side to an image source side along an optical axis 795: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of four lenses with refractive power, but is not limited thereto.

The first element group E1 includes, in order from the visual side to the image source side along the optical axis 795: a stop 700 and a first lens group G1.

The stop 700 may be located in a position where the user's eyes view an image.

The first lens group G1 with positive refractive power and includes only a first lens 710. The first lens 710 with positive refractive power includes a visual-side surface 711 and an image source-side surface 712, the visual-side surface 711 of the first lens 710 is convex in a paraxial region thereof, the image source-side surface 712 of the first lens 710 is convex in a paraxial region thereof, the visual-side surface 711 and the image source-side surface 712 of the first lens 710 are aspheric, and the first lens 710 is made of plastic.

The second element group E2 includes an optical element 760, a second lens group G2 and a partial-reflective-partial-transmissive element 770.

The second lens group G2 with positive refractive power includes, in order from the visual side to the image source side along the optical axis 795: a second lens 720, a third lens 730 and a fourth lens 740.

The second lens 720 with negative refractive power includes a visual-side surface 721 and an image source-side surface 722, the visual-side surface 721 of the second lens 720 is concave in a paraxial region thereof, the image source-side surface 722 of the second lens 720 is flat in a paraxial region thereof, the visual-side surface 721 of the second lens 720 is aspheric, and the second lens 720 is made of plastic.

The third lens 730 with negative refractive power includes a visual-side surface 731 and an image source-side surface 732, the visual-side surface 731 of the third lens 730 is flat in a paraxial region thereof, the image source-side surface 732 of the third lens 730 is concave in a paraxial region thereof, the image source-side surface 732 of the third lens 730 is aspheric, and the third lens 730 is made of plastic.

The fourth lens 740 with positive refractive power includes a visual-side surface 741 and an image source-side surface 742, the visual-side surface 741 of the fourth lens 740 is convex in a paraxial region thereof, the image source-side surface 742 of the fourth lens 740 is convex in a paraxial region thereof, the visual-side surface 741 and the image source-side surface 742 of the fourth lens 740 are aspheric, and the fourth lens 740 is made of plastic.

The third lens 730 and the fourth lens 740 together form a cemented doublet lens.

The optical element 760 is located between the second lens 720 and the third lens 730, and the opposite two sides of the optical element 760 are attached to the image source-side surface 722 of the second lens 720 and the visual-side surface 731 of the third lens 730, respectively. The configuration of the optical element 760 is the same as that of the optical element 160 of the first embodiment and will not be explained again.

The partial-reflective-partial-transmissive element 770 is located on the image source-side surface 742 of the fourth lens 740, and the configuration of the partial-reflective-partial-transmissive element 770 is the same as that of the partial-reflective-partial-transmissive element 170 of the first embodiment and will not be explained again.

The third element group E3 includes, in order from the visual side to the image source side along the optical axis 795: a second phase retarder 780 and an image source plane 791.

The configuration of the second phase retarder 780 is the same as that of the second phase retarder 180 of the first embodiment and will not be explained again.

The optical lens assembly works in cooperation with an image source 793 disposed on the image source plane 791. The image source plane 791 is located between the second phase retarder 780 and the image source 793. In the present embodiment, the type of the image source 793 is, for example, but not limited to, a liquid crystal display. However, in other embodiments, if the type of the image source 793 is an OLED display, a LED display, or other displays that can emit circularly-polarized light, the second phase retarder 780 may be omitted.

Please refer to Tables 25 to 28, Table 25 shows the detailed optical data of the elements of the optical lens assembly of the seventh embodiment, Table 26 shows the aspheric coefficients of the lenses of the seventh embodiment, Table 27 shows the remaining parameters of the optical lens assembly of the seventh embodiment and the values thereof, and the values of the parameters in Tables 25 and 27 satisfy the conditional formulas of Table 28. In Table 27, a focal length of the fourth lens 740 is f4. In the seventh embodiment, the equation of the aspheric surface profiles of the aforementioned lenses is the same as the equation of the aspheric surface profiles of the aforementioned lenses in the first embodiment. The definitions of the surfaces in Table 25 can be referred to the relevant description of Table 1 and will not be explained again.

TABLE 25

Embodiment 7
Near point: f_N = 25.40 mm, EPD(entrance pupil diameter) = 10.00 mm, FOV_N = 89.8°
Far point: f_F = 23.94 mm, EPD (entrance pupil diameter) = 10.00 mm, FOV_F = 99.4°

| Surface | | Curvature Radius | Thickness/gap | Refractive Index (nd) | Abbe number (vd) | Refraction/reflection |
|---|---|---|---|---|---|---|
| 0 | Stop | Infinity | 12.000 | — | — | — |
| 1 | First lens | 72.480 | 6.083 | 1.545 | 57.0 | Refraction |
| 2 | | −73.832 | 4.884(Near point) 0.100(Far point) | — | — | Refraction |
| 3 | Second lens | −181.175 | 2.000 | 1.657 | 20.9 | Refraction |

TABLE 25-continued

Embodiment 7
Near point: f_N = 25.40 mm, EPD(entrance pupil diameter) = 10.00 mm, FOV_N = 89.8°
Far point: f_F = 23.94 mm, EPD (entrance pupil diameter) = 10.00 mm, FOV_F = 99.4°

| Surface | | Curvature Radius | Thickness/gap | Refractive Index (nd) | Abbe number (vd) | Refraction/reflection |
|---|---|---|---|---|---|---|
| 4 | | Infinity | 0.000 | — | — | Refraction |
| 5 | Absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 1.825 | 1.657 | 20.9 | Refraction |
| 9 | Fourth lens | 194.941 | 9.533 | 1.545 | 57.0 | Refraction |
| 10 | Partial-reflective-partial-transmissive element | −89.819 | −9.533 | 1.545 | 57.0 | Reflection |
| 11 | Third lens | 194.941 | −1.825 | 1.657 | 20.9 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | Reflective polarizer | Infinity | 0.100 | 1.533 | 56.0 | Reflection |
| 15 | First phase retarder | Infinity | 0.100 | 1.533 | 56.0 | Refraction |
| 16 | Third lens | Infinity | 1.825 | 1.657 | 20.9 | Refraction |
| 17 | Fourth lens | 194.941 | 9.533 | 1.545 | 57.0 | Refraction |
| 18 | | −89.819 | 1.370(Near point) 6.154(Far point) | — | — | Refraction |
| 19 | Second phase retarder | Infinity | 0.100 | 1.533 | 56.0 | Refraction |
| 20 | Image source plane | Infinity | — | — | — | — |

The reference wavelength is 555 nm

TABLE 26

Embodiment 7
Aspheric Coefficients

| Surface | 1 | 2 | 3 | 4 |
|---|---|---|---|---|
| K: | 0.0000E+00 | 0.0000E+00 | 0.0000E+00 | 0.0000E+00 |
| A2: | 0.0000E+00 | 0.0000E+00 | 0.0000E+00 | 0.0000E+00 |
| A4: | −2.9230E−05 | −2.5948E−05 | 8.2913E−06 | 0.0000E+00 |
| A6: | 2.0283E−07 | 8.6459E−08 | 4.1865E−10 | 0.0000E+00 |
| A8: | −6.6271E−10 | −7.3762E−12 | 6.3604E−12 | 0.0000E+00 |
| A10: | −2.4062E−12 | −2.6130E−14 | 0.0000E+00 | 0.0000E+00 |
| A12: | 2.7147E−14 | −8.6235E−15 | 0.0000E+00 | 0.0000E+00 |
| A14: | −8.3399E−17 | 4.6143E−17 | 0.0000E+00 | 0.0000E+00 |
| A16: | 7.7536E−20 | −7.7351E−20 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 12, 16 | 9, 11, 17 | 10, 18 | — |
|---|---|---|---|---|
| K: | 0.0000E+00 | 5.2222E+01 | −1.3984E+01 | — |
| A2: | 0.0000E+00 | 0.0000E+00 | 0.0000E+00 | — |
| A4: | 0.0000E+00 | 1.6258E−05 | −1.1942E−06 | — |
| A6: | 0.0000E+00 | −1.3258E−07 | 7.3026E−09 | — |
| A8: | 0.0000E+00 | 8.4140E−10 | −3.8825E−11 | — |
| A10: | 0.0000E+00 | −3.3251E−12 | 1.1984E−13 | — |
| A12: | 0.0000E+00 | 7.6933E−15 | −1.9609E−16 | — |
| A14: | 0.0000E+00 | −9.3893E−18 | 1.5024E−19 | — |
| A16: | 0.0000E+00 | 4.6671E−21 | −2.8697E−23 | — |
| A18: | 0.0000E+00 | 0.0000E+00 | 0.0000E+00 | — |
| A20: | 0.0000E+00 | 0.0000E+00 | 0.0000E+00 | — |

TABLE 27

Embodiment 7

| f_G1 [mm] | 67.76 | CTG2 [mm] | 13.66 | G2R3 [mm] | 194.94 |
|---|---|---|---|---|---|
| f_G2 [mm] | 499.25 | MS1 [mm] | 20.01 | G2R4 [mm] | −89.82 |
| T12_N [mm] | 4.88 | MS2_F [mm] | 19.91 | TL [mm] | 26.09 |

TABLE 27-continued

Embodiment 7

| | | | | | |
|---|---|---|---|---|---|
| T12_F [mm] | 0.10 | G1R1 [mm] | 72.48 | IMH [mm] | 19.25 |
| CTG1 [mm] | 6.08 | G1R2 [mm] | −73.83 | f1 [mm] | 67.76 |
| f2 [mm] | −271.04 | f3 [mm] | −291.63 | f4 [mm] | 113.59 |

TABLE 28

Embodiment 7

| | | | |
|---|---|---|---|
| f_G1/f_G2 | 0.14 | f_G1/CTG1 | 11.14 |
| (CTG1 + CTG2)/T12_N | 4.04 | f_F/f_G1 | 0.35 |
| G2R4/G2R3 | −0.46 | f_G1/G1R1 | 0.93 |
| f_N*TL/(f_F*IMH) | 1.44 | f_G2/G2R3 | 2.56 |
| (FOV_F − FOV_N)/(T12_F − T12_N)[°/mm] | −2.01 | f_G2/G2R4 | −5.56 |
| (G2R3 + G2R4)/(G2R3 − G2R4) | 0.37 | MS2_F/f_G2 | 0.04 |
| CTG2/CTG1 | 2.25 | FOV_N/FOV_F | 0.90 |
| CTG1/G1R1 | 0.08 | (f_F/G1R1) + (f_F/G1R2) | 0.01 |
| CTG1/G1R2 | −0.08 | FOV_F/(T12_F*IMH) [°/mm$^2$] | 51.64 |
| MS1/CTG2 | 1.47 | TL/IMH | 1.36 |

Eighth Embodiment

Figure 8A:
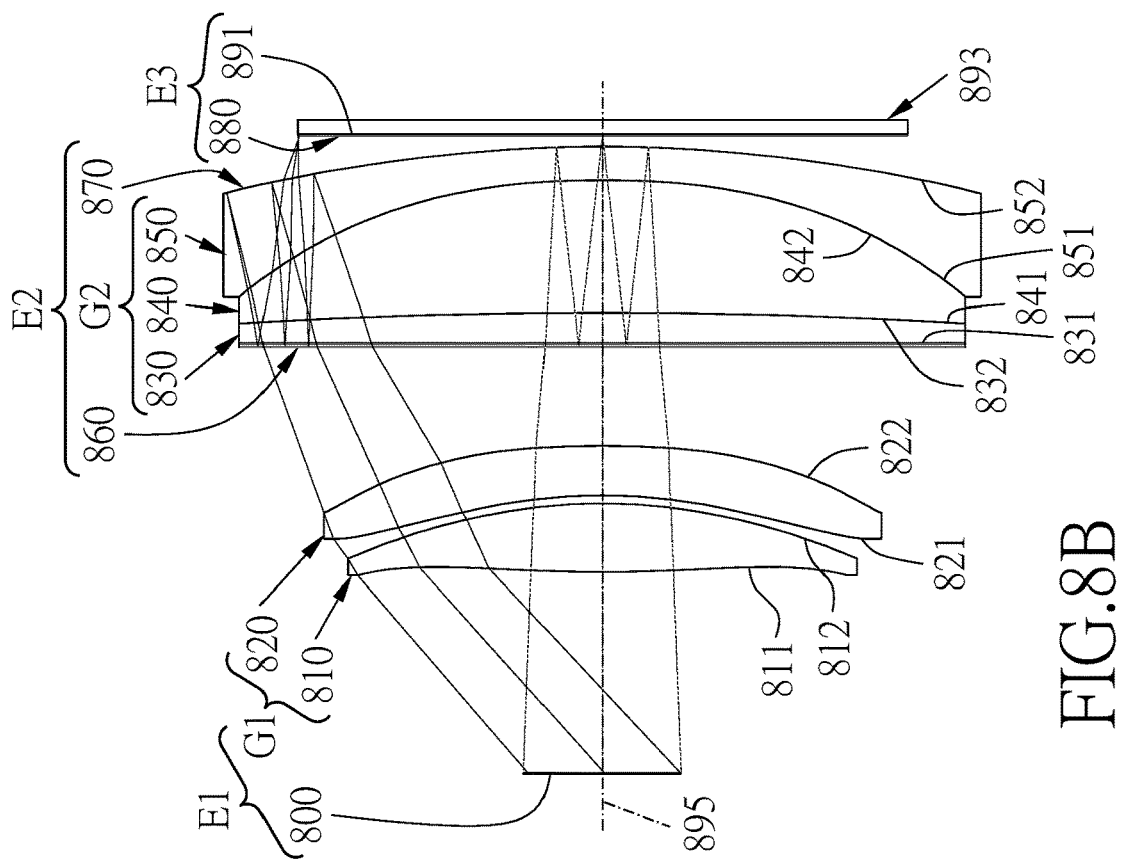
FIG. 8A is a schematic diagram of an optical lens assembly focusing on a far point in accordance with an eighth embodiment of the present invention.
Figure 8B:
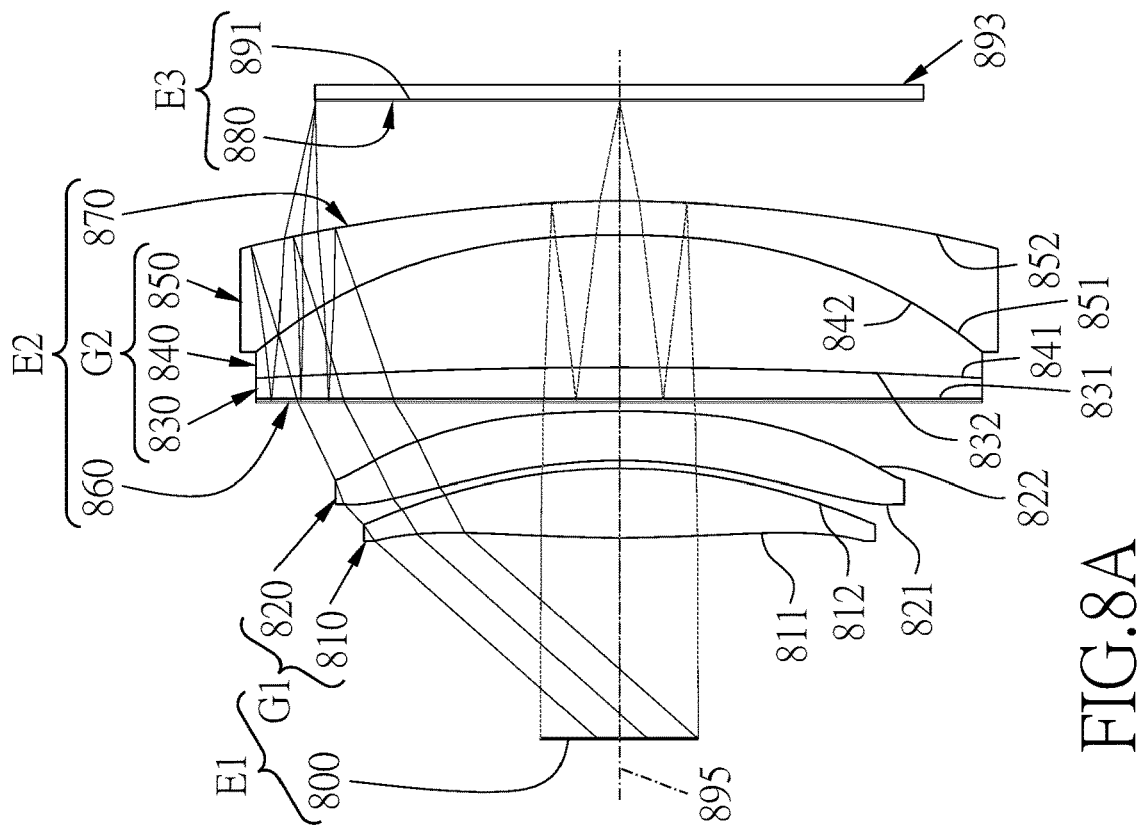
FIG. 8B is a schematic diagram of the optical lens assembly focusing on a near point in accordance with the eighth embodiment of the present invention.

Referring to FIGS. 8A and 8B, an optical lens assembly in accordance with an eighth embodiment of the present invention includes, in order from a visual side to an image source side along an optical axis 895: a first element group E1, a second element group E2 and a third element group E3. When the focus of the optical lens assembly is changed from a far point to a near point, the first element group E1 and the third element group E3 do not move, the second element group E2 moves from the visual side to the image source side relative to the first element group E1 and the third element group E3. The optical lens assembly has a total of five lenses with refractive power, but is not limited thereto.

The first element group E1 includes, in order from the visual side to the image source side along the optical axis 895: a stop 800 and a first lens group G1.

The stop 800 may be located in a position where the user's eyes view an image.

The first lens group G1 with positive refractive power and includes, in order from the visual side to the image source side along the optical axis 895: a first lens 810 and a second lens 820.

The first lens 810 with positive refractive power includes a visual-side surface 811 and an image source-side surface 812, the visual-side surface 811 of the first lens 810 is convex in a paraxial region thereof, the image source-side surface 812 of the first lens 810 is convex in a paraxial region thereof, the visual-side surface 811 and the image source-side surface 812 of the first lens 810 are aspheric, and the first lens 810 is made of plastic.

The second lens 820 with negative refractive power includes a visual-side surface 821 and an image source-side surface 822, the visual-side surface 821 of the second lens 820 is concave in a paraxial region thereof, the image source-side surface 822 of the second lens 820 is convex in a paraxial region thereof, the visual-side surface 821 and the image source-side surface 822 of the second lens 720 are aspheric, and the second lens 820 is made of plastic.

The second element group E2 includes, in order from the visual side to the image source side along the optical axis 895: an optical element 860, a second lens group G2 and a partial-reflective-partial-transmissive element 870.

The second lens group G2 with positive refractive power includes, in order from the visual side to the image source side along the optical axis 895: a third lens 830, a fourth lens 840 and a fifth lens 850.

The third lens 830 with positive refractive power includes a visual-side surface 831 and an image source-side surface 832, the visual-side surface 831 of the third lens 830 is flat in a paraxial region thereof, the image source-side surface 832 of the third lens 830 is convex in a paraxial region thereof, the image source-side surface 832 of the third lens 830 is spherical, and the third lens 830 is made of plastic.

The fourth lens 840 with positive refractive power includes a visual-side surface 841 and an image source-side surface 842, the visual-side surface 841 of the fourth lens 840 is concave in a paraxial region thereof, the image source-side surface 842 of the fourth lens 840 is convex in a paraxial region thereof, the visual-side surface 841 of the fourth lens 840 is spherical, the image source-side surface 842 of the fourth lens 840 is aspheric, and the fourth lens 840 is made of plastic.

The fifth lens 850 with negative refractive power includes a visual-side surface 851 and an image source-side surface 852, the visual-side surface 851 of the fifth lens 850 is concave in a paraxial region thereof, the image source-side surface 852 of the fifth lens 850 is convex in a paraxial region thereof, the visual-side surface 851 and the image source-side surface 852 of the fifth lens 850 are aspheric, and the fifth lens 850 is made of plastic.

The third lens 830, the fourth lens 840 and the fifth lens 850 together form a cemented doublet lens.

The optical element 860 is located on the visual-side surface 831 of the third lens 830, and the configuration of the optical element 860 is the same as that of the optical element 160 of the first embodiment and will not be explained again.

The partial-reflective-partial-transmissive element 870 is located on the image source-side surface 852 of the fifth lens 850, and the configuration of the partial-reflective-partial-transmissive element 870 is the same as that of the partial-reflective-partial-transmissive element 170 of the first embodiment and will not be explained again.

The third element group E3 includes, in order from the visual side to the image source side along the optical axis 895: a second phase retarder 880 and an image source plane 891.

The configuration of the second phase retarder 880 is the same as that of the second phase retarder 180 of the first embodiment and will not be explained again.

The optical lens assembly works in cooperation with an image source 893 disposed on the image source plane 891. The image source plane 891 is located between the second phase retarder 880 and the image source 893. In the present embodiment, the type of the image source 893 is, for example, but not limited to, a liquid crystal display. However, in other embodiments, if the type of the image source 893 is an OLED display, a LED display, or other displays that can emit circularly-polarized light, the second phase retarder 780 may be omitted.

Please refer to Tables 29 to 32, Table 29 shows the detailed optical data of the elements of the optical lens assembly of the eighth embodiment, Table 30 shows the aspheric coefficients of the lenses of the eighth embodiment, Table 31 shows the remaining parameters of the optical lens assembly of the eighth embodiment and the values thereof, and the values of the parameters in Tables 29 and 31 satisfy the conditional formulas of Table 32. In Table 31, a focal length of the fourth lens 840 is f4, a focal length pf the fifth lens 850 is f5. In the eighth embodiment, the equation of the aspheric surface profiles of the aforementioned lenses is the same as the equation of the aspheric surface profiles of the aforementioned lenses in the first embodiment. The definitions of the surfaces in Table 29 can be referred to the relevant description of Table 1 and will not be explained again.

TABLE 29

Embodiment 8
Near point: f_N = 25.42 mm, EPD(entrance pupil diameter) = 10.00 mm, FOV_N = 87.4°
Far point: f_F = 24.04 mm, EPD (entrance pupil diameter) = 10.00 mm, FOV_F = 100.3°

| Surface | | Curvature Radius | Thickness/gap | Refractive Index (nd) | Abbe number (vd) | Refraction/ reflection |
|---|---|---|---|---|---|---|
| 0 | Stop | Infinity | 12.000 | — | — | — |
| 1 | First lens | 84.681 | 4.112 | 1.545 | 57.0 | Refraction |
| 2 | | −40.940 | 0.460 | — | — | Refraction |
| 3 | Second lens | −43.228 | 2.979 | 1.657 | 20.9 | Refraction |
| 4 | | −87.131 | 5.845(Near point) 0.500(Far point) | — | — | Refraction |
| 5 | Absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 1.800 | 1.657 | 20.9 | Refraction |
| 9 | Fourth lens | −402.954 | 7.904 | 1.545 | 57.0 | Refraction |
| 10 | Fifth lens | −63.736 | 2.000 | 1.657 | 20.9 | Refraction |
| 11 | Partial-reflective-partial-transmissive element | −93.761 | −2.000 | 1.657 | 20.9 | Reflection |
| 12 | Fourth lens | −63.736 | −7.904 | 1.545 | 57.0 | Refraction |
| 13 | Third lens | −402.954 | −1.800 | 1.657 | 20.9 | Refraction |
| 14 | First phase retarder | Infinity | −0.100 | 1.533 | 56.0 | Refraction |
| 15 | Reflective polarizer | Infinity | −0.100 | 1.533 | 56.0 | Refraction |
| 16 | Reflective polarizer | Infinity | 0.100 | 1.533 | 56.0 | Reflection |
| 17 | First phase retarder | Infinity | 0.100 | 1.533 | 56.0 | Refraction |
| 18 | Third lens | Infinity | 1.800 | 1.657 | 20.9 | Refraction |
| 19 | Fourth lens | −402.954 | 7.904 | 1.545 | 57.0 | Refraction |
| 20 | Fifth lens | −63.736 | 2.000 | 1.657 | 20.9 | Refraction |
| 21 | | −93.761 | 0.570(Near point) 5.915(Far point) | — | — | Refraction |
| 22 | Second phase retarder | Infinity | 0.100 | 1.533 | 56.0 | Refraction |
| 23 | Image source plane | Infinity | — | — | — | — |

The reference wavelength is 555 nm.

TABLE 30

Embodiment 8
Aspheric Coefficients

| Surface | 1 | 2 | 3 | 4 |
|---|---|---|---|---|
| K: | 0.0000E+00 | 1.3242E+00 | −9.9328E−02 | 0.0000E+00 |
| A2: | 0.0000E+00 | 0.0000E+00 | 0.0000E+00 | 0.0000E+00 |
| A4: | −4.0082E−05 | −5.3827E−05 | −7.7335E−05 | −6.9716E−05 |
| A6: | 2.9631E−07 | 1.0690E−06 | 1.3451E−06 | 5.2013E−07 |
| A8: | −3.0455E−09 | −7.6409E−09 | −9.0194E−09 | −2.9477E−09 |
| A10: | 1.8852E−11 | 2.3987E−11 | 2.8909E−11 | 1.0134E−11 |
| A12: | −7.3407E−14 | −2.7515E−14 | −3.3947E−14 | −1.9021E−14 |
| A14: | 1.5700E−16 | 0.0000E+00 | −2.2088E−17 | 9.2620E−18 |
| A16: | −1.3465E−19 | 0.0000E+00 | 6.2136E−20 | 1.8312E−20 |

TABLE 30-continued

Embodiment 8
Aspheric Coefficients

|      |            |            |            |            |
|------|------------|------------|------------|------------|
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 8, 14, 18 | 9, 13, 19 | 10, 12, 20 | 11, 21 |
|---------|-----------|-----------|------------|--------|
| K:   | 0.0000E+00 | 0.0000E+00 | −1.3307E+01 | −2.1991E+01 |
| A2:  | 0.0000E+00 | 0.0000E+00 | 0.0000E+00  | 0.0000E+00  |
| A4:  | 0.0000E+00 | 0.0000E+00 | −2.4581E−05 | −9.8415E−07 |
| A6:  | 0.0000E+00 | 0.0000E+00 | 3.9578E−08  | 1.8569E−10  |
| A8:  | 0.0000E+00 | 0.0000E+00 | −4.3587E−11 | −4.9480E−12 |
| A10: | 0.0000E+00 | 0.0000E+00 | 1.5074E−14  | 2.7655E−14  |
| A12: | 0.0000E+00 | 0.0000E+00 | 0.0000E+00  | −7.8498E−17 |
| A14: | 0.0000E+00 | 0.0000E+00 | 0.0000E+00  | 1.0260E−19  |
| A16: | 0.0000E+00 | 0.0000E+00 | 0.0000E+00  | −5.1703E−23 |
| A18: | 0.0000E+00 | 0.0000E+00 | 0.0000E+00  | 0.0000E+00  |
| A20: | 0.0000E+00 | 0.0000E+00 | 0.0000E+00  | 0.0000E+00  |

TABLE 31

Embodiment 8

| f_G1 [mm]  | 83.54   | CTG2 [mm]  | 11.70  | G2R3 [mm] | −63.74 |
| f_G2 [mm]  | 180.46  | MS1 [mm]   | 18.52  | G2R4 [mm] | −93.76 |
| T12_N [mm] | 6.15    | MS2_F [mm] | 17.72  | TL [mm]   | 26.07  |
| T12_F [mm] | 0.80    | G1R1 [mm]  | 84.68  | IMH [mm]  | 19.25  |
| CTG1 [mm]  | 7.55    | G1R2 [mm]  | −87.13 | f1 [mm]   | 50.97  |
| f2 [mm]    | −131.93 | f3 [mm]    | 602.82 | f4 [mm]   | 137.08 |
| f5 [mm]    | −305.92 | —          |        | —         |        |

TABLE 32

Embodiment 8

| f_G1/f_G2 | 0.46 | f_G1/CTG1 | 11.06 |
| (CTG1 + CTG2)/T12_N | 3.13 | f_F/f_G1 | 0.29 |
| G2R4/G2R3 | 1.47 | f_G1/G1R1 | 0.99 |
| f_N*TL/(f_F*IMH) | 1.43 | f_G2/G2R3 | −2.83 |
| (FOV_F − FOV_N)/(T12_F − T12_N)[°/mm] | −2.41 | f_G2/G2R4 | −1.92 |
| (G2R3 + G2R4)/(G2R3 − G2R4) | −5.25 | MS2_F/f_G2 | 0.10 |
| CTG2/CTG1 | 1.55 | FOV_N/FOV_F | 0.87 |
| CTG1/G1R1 | 0.09 | (f_F/G1R1) + (f_F/G1R2) | 0.01 |
| CTG1/G1R2 | −0.09 | FOV_F/(T12_F*IMH) [°/mm²] | 6.51 |
| MS1/CTG2 | 1.58 | TL/IMH | 1.35 |

For the optical lens assembly in the present invention, the lenses can be made of plastic or glass. If a lens is made of plastic, it is conducive to reducing the manufacturing cost. If a lens is made of glass, it is conducive to enhancing the degree of freedom in the arrangement of refractive power of the optical lens assembly.

Moreover, the disposition of at least one cemented doublet lens in the optical lens assembly utilizes is conducive to reducing the chromatic dispersion.

Moreover, one or both of the visual-side and image source-side surfaces of one or more lenses of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens with refractive power is concave and the location of the concave portion of the respective lens surface of the respective lens is not defined, the concave portion is typically located in a paraxial region of the respective lens surface of the respective lens.

Figure 9:
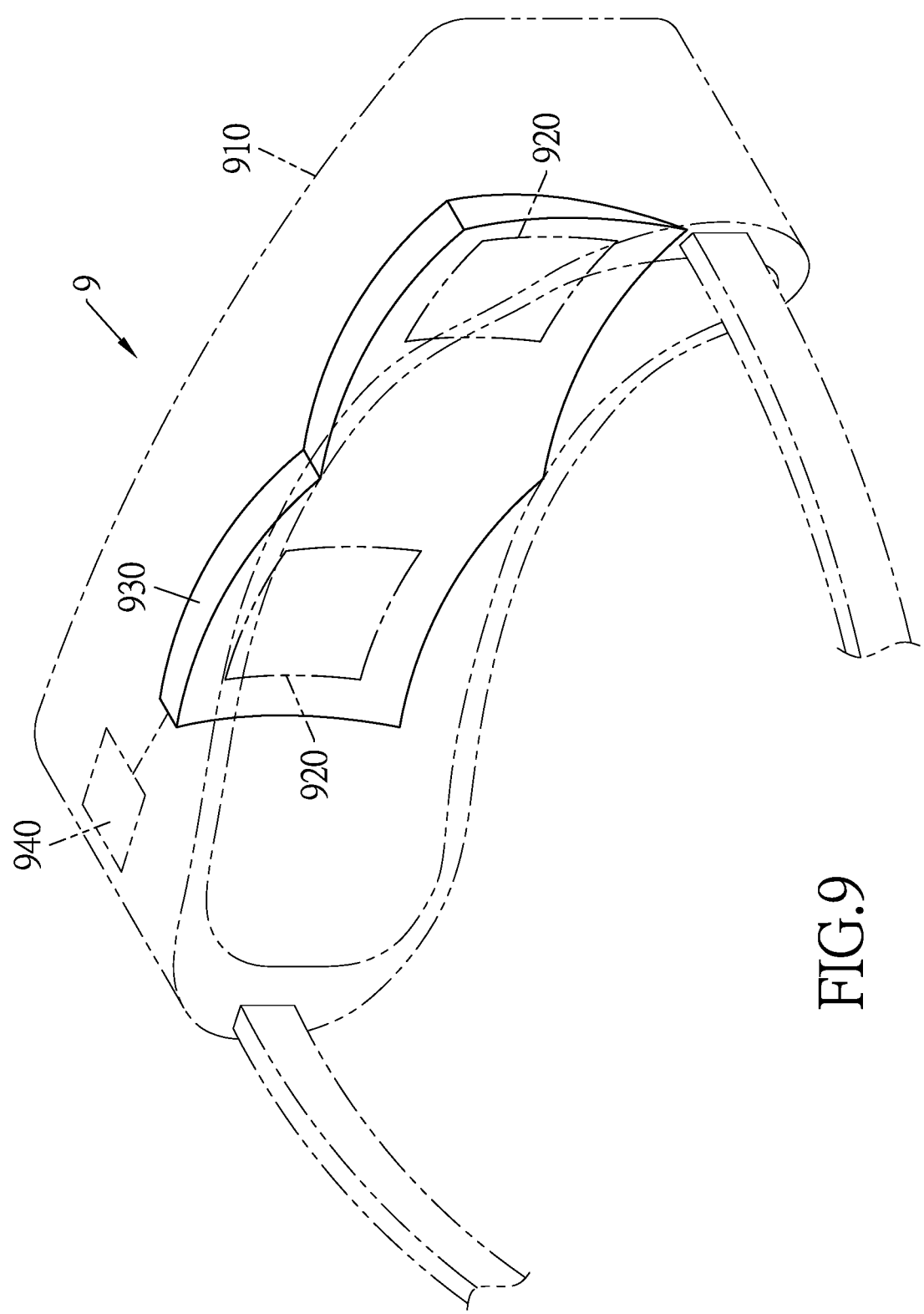
FIG. 9 is a schematic diagram of a head-mounted electronic device in accordance with an embodiment of the present invention.

The optical lens assembly of the present invention can be used in head-mounted electronic devices as required. FIG. 9 shows a head-mounted electronic device in accordance with an embodiment of the present invention. The head-mounted electronic device 9 is a head-mounted display device using, but not limited to, virtual reality (VR) technology, and includes a housing 910, an optical module 920, an image source 930 and a controller 940.

The optical module 920 corresponds to the left and right eyes of the user. The optical module 920 includes an optical lens assembly described in any one of the first to eighth embodiments.

The image source 930 includes an image source described in any one of the first to eighth embodiments. The image source 930 corresponds to the left and right eyes of the user, and the type of the image source 930 may be an OLED display, a LED display, or a liquid crystal display with a linear polarizer, but is not limited thereto.

The controller 940 is electrically connected to the image source 930, so as to control the image source 930 to display an image, whereby the head-mounted electronic device 9 can project the image to the eyes of the user to form an image.

What is claimed is:

1. An optical lens assembly comprising:
   a first element group comprising:
      a first lens group with positive refractive power, comprising one or two lenses;
   a second element group comprising:
      a second lens group with positive refractive power, comprising two or three lenses;
      an optical element comprising, in order from a visual side to an image source side, an absorptive polarizer, a reflective polarizer and a first phase retarder; and
      a partial-reflective-partial-transmissive element; and
   a third element group comprising an image source plane;
   wherein the first element group, the second element group and the third element group are arranged in order from the visual side to the image source side, a focal length of the first lens group is f_G1, a focal length of the second lens group is f_G2, a distance from a visual-side surface of the lens of the first lens group which is closest to the visual side, to an image source-side surface of the lens of the first lens group which is closest to the image source side, along an optical axis is CTG1, a distance from a visual-side surface of the lens of the second lens group which is closest to the visual side, to an image source-side surface of the lens of the second lens group which is closest to the image source side, along the optical axis is CTG2, a distance from the image source-side surface of the lens of the first lens group which is closest to the image source side, to the visual-side surface of the lens of the second lens group which is closest to the visual side, along the optical axis when the optical lens assembly focuses on a near point is T12_N, and the following conditions are satisfied: 0.10<f_G2/f_G1<1.44 and 1.11<(CTG1+CTG2)/T12_N<6.06.

2. The optical lens assembly as claimed in claim 1, wherein a radius of curvature of a visual-side surface of the lens of the second lens group which is closest to the image source side is G2R3, a radius of curvature of the image source-side surface of the lens of the second lens group which is closest to the image source side is G2R4, and the following condition is satisfied: −1.28<G2R4/G2R3<2.03.

3. The optical lens assembly as claimed in claim 1, wherein a focal length of the optical lens assembly focusing on the near point is f_N, a focal length of the optical lens assembly focusing on a far point is f_F, a distance from the visual-side surface of the lens of the first lens group which is closest to the visual side, to the image source plane along the optical axis is TL, a maximum image-source height of the optical lens assembly is IMH, and the following condition is satisfied: 1.04<f_N*TL/(f_F*IMH)<1.96.

4. The optical lens assembly as claimed in claim 1, wherein a maximum field of view of the optical lens assembly focusing on the near point is FOV_N, a maximum field of view of the optical lens assembly focusing on a far point is FOV_F, the distance from the image source-side surface of the lens of the first lens group which is closest to the image source side, to the visual-side surface of the lens of the second lens group which is closest to the visual side, along the optical axis when the optical lens assembly focuses on the near point is T12_N, a distance from the image source-side surface of the lens of the first lens group which is closest to the image source side, to the visual-side surface of the lens of the second lens group which is closest to the visual side, along the optical axis when the optical lens assembly focuses on the far point is T12_F, and the following condition is satisfied: −4.11°/mm<(FOV_F−FOV_N)/(T12_F−T12_N)<−1.61°/mm.

5. The optical lens assembly as claimed in claim 1, wherein a radius of curvature of a visual-side surface of the lens of the second lens group which is closest to the image source side is G2R3, a radius of curvature of the image source-side surface of the lens of the second lens group which is closest to the image source side is G2R4, and the following condition is satisfied: −23.15<(G2R3+G2R4)/(G2R3−G2R4)<2.82.

6. The optical lens assembly as claimed in claim 1, wherein the distance from the visual-side surface of the lens of the first lens group which is closest to the visual side, to the image source-side surface of the lens of the first lens group which is closest to the image source side, along the optical axis is CTG1, the distance from the visual-side surface of the lens of the second lens group which is closest to the visual side, to the image source-side surface of the lens of the second lens group which is closest to the image source side, along the optical axis is CTG2, and the following condition is satisfied: 0.66<CTG2/CTG1<2.82.

7. The optical lens assembly as claimed in claim 1, wherein the distance from the visual-side surface of the lens of the first lens group which is closest to the visual side, to the image source-side surface of the lens of the first lens group which is closest to the image source side, along the optical axis is CTG1, a radius of curvature of the visual-side surface of the lens of the first lens group which is closest to the visual side is G1R1, and the following condition is satisfied: 0.04<CTG1/G1R1<0.25.

8. The optical lens assembly as claimed in claim 1, wherein the distance from the visual-side surface of the lens of the second lens group which is closest to the visual side, to the image source-side surface of the lens of the second lens group which is closest to the image source side, along the optical axis is CTG2, a distance from the image source-side surface of the lens of the first lens group which is closest to the image source side, to the image source plane along the optical axis is MS1, and the following condition is satisfied: 1.17<MS1/CTG2<2.81.

9. The optical lens assembly as claimed in claim 1, wherein the focal length of the first lens group is f_G1, the distance from the visual-side surface of the lens of the first lens group which is closest to the visual side, to the image source-side surface of the lens of the first lens group which is closest to the image source side, along the optical axis is CTG1, and the following condition is satisfied: 8.57<f_G1/CTG1<19.17.

10. The optical lens assembly as claimed in claim 1, wherein the focal length of the first lens group is f_G1, a focal length of the optical lens assembly focusing on a far point is f_F, and the following condition is satisfied: 0.11<f_F/f_G1<0.44.

11. The optical lens assembly as claimed in claim 1, wherein the focal length of the first lens group is f_G1, a radius of curvature of the visual-side surface of the lens of the first lens group which is closest to the visual side is G1R1, and the following condition is satisfied: 0.57<f_G1/G1R1<3.34.

12. The optical lens assembly as claimed in claim 1, wherein the focal length of the second lens group is f_G2, a radius of curvature of the image source-side surface of the lens of the second lens group which is closest to the image source side is G2R4, and the following condition is satisfied: −7.17<f_G2/G2R4<−1.35.

13. The optical lens assembly as claimed in claim 1, wherein the focal length of the second lens group is f_G2, a distance from the visual-side surface of the lens of the second lens group which is closest to the visual side, to the image source plane along the optical axis when the optical lens assembly focuses on a far point is MS2_F, and the following condition is satisfied: 0.03<MS2_F/f_G2<0.16.

14. The optical lens assembly as claimed in claim 1, wherein a maximum field of view of the optical lens assembly focusing on the near point is FOV_N, a maximum field of view of the optical lens assembly focusing on a far point is FOV_F, and the following condition is satisfied: 0.64<FOV_N/FOV_F<1.09.

15. The optical lens assembly as claimed in claim 1, wherein a focal length of the optical lens assembly focusing on a far point is f_F, a radius of curvature of the visual-side surface of the lens of the first lens group which is closest to the visual side is G1R1, a radius of curvature of the image source-side surface of the lens of the first lens group which is closest to the image source side is G1R2, and the following condition is satisfied: −0.16<(f_F/G1R1)+(f_F/G1R2)<0.23.

16. The optical lens assembly as claimed in claim 1, wherein a maximum field of view of the optical lens assembly focusing on a far point is FOV_F, a distance from the image source-side surface of the lens of the first lens group which is closest to the image source side, to the visual-side surface of the lens of the second lens group which is closest to the visual side, along the optical axis when the optical lens assembly focuses on the far point is T12_F, a maximum image-source height of the optical lens assembly is IMH, and the following condition is satisfied: 0.94°/mm2<FOV_F/(T12_F*IMH)<62.28°/mm2.

17. A head-mounted electronic device comprising:
a housing;
an optical lens assembly being disposed in the housing;
an image source being disposed on an image source plane of the optical lens assembly in the housing; and
a controller being disposed in the housing and electrically connected to the image source;
wherein the optical lens assembly comprising:
a first element group comprising:
  a first lens group with positive refractive power, comprising one or two lenses;
a second element group comprising:
  a second lens group with positive refractive power, comprising two or three lenses;
  an optical element comprising, in order from a visual side to an image source side, an absorptive polarizer, a reflective polarizer and a first phase retarder; and
a partial-reflective-partial-transmissive element; and
a third element group comprising the image source plane;
wherein the first element group, the second element group and the third element group are arranged in order from the visual side to the image source side, a focal length of the first lens group is f_G1, a focal length of the second lens group is f_G2, a distance from a visual-side surface of the lens of the first lens group which is closest to the visual side, to an image source-side surface of the lens of the first lens group which is closest to the image source side, along an optical axis is CTG1, a distance from a visual-side surface of the lens of the second lens group which is closest to the visual side, to an image source-side surface of the lens of the second lens group which is closest to the image source side, along the optical axis is CTG2, a distance from the image source-side surface of the lens of the first lens group which is closest to the image source side, to the visual-side surface of the lens of the second lens group which is closest to the visual side, along the optical axis when the optical lens assembly focuses on a near point is T12_N, and the following conditions are satisfied: 0.10<f_G2/f_G1<1.44 and 1.11<(CTG1+CTG2)/T12_N<6.06.

18. The head-mounted electronic device as claimed in claim 17, wherein a focal length of the optical lens assembly focusing on the near point is f_N, a focal length of the optical lens assembly focusing on a far point is f_F, a distance from the visual-side surface of the lens of the first lens group which is closest to the visual side, to the image source plane along the optical axis is TL, a maximum image-source height of the optical lens assembly is IMH, and the following condition is satisfied: 1.04<f_N*TL/(f_F*IMH)<1.96.

19. The head-mounted electronic device as claimed in claim 17, wherein the distance from the visual-side surface of the lens of the first lens group which is closest to the visual side, to the image source-side surface of the lens of the first lens group which is closest to the image source side, along the optical axis is CTG1, the distance from the visual-side surface of the lens of the second lens group which is closest to the visual side, to the image source-side surface of the lens of the second lens group which is closest to the image source side, along the optical axis is CTG2, and the following condition is satisfied: 0.66<CTG2/CTG1<2.82.

20. The head-mounted electronic device as claimed in claim 17, wherein the distance from the visual-side surface of the lens of the second lens group which is closest to the visual side, to the image source-side surface of the lens of the second lens group which is closest to the image source side, along the optical axis is CTG2, a distance from the image source-side surface of the lens of the first lens group which is closest to the image source side, to the image source plane along the optical axis is MS1, and the following condition is satisfied: 1.17<MS1/CTG2<2.81.

21. The head-mounted electronic device as claimed in claim 17, wherein the focal length of the second lens group is f_G2, a distance from the visual-side surface of the lens of the second lens group which is closest to the visual side, to the image source plane along the optical axis when the optical lens assembly focuses on a far point is MS2_F, and the following condition is satisfied: 0.03<MS2_F/f_G2<0.16.

22. The head-mounted electronic device as claimed in claim 17, wherein a maximum field of view of the optical lens assembly focusing on a far point is FOV_F, a distance from the image source-side surface of the lens of the first lens group which is closest to the image source side, to the visual-side surface of the lens of the second lens group which is closest to the visual side, along the optical axis when the optical lens assembly focuses on the far point is T12_F, a maximum image-source height of the optical lens assembly is IMH, and the following condition is satisfied: 0.94°/mm2<FOV_F/(T12_F*IMH)<62.28°/mm2.

* * * * *